(12) United States Patent
Maguire

(10) Patent No.: US 9,850,888 B2
(45) Date of Patent: Dec. 26, 2017

(54) MOLDED DIAPHRAGM LIQUID COLOR PUMP

(71) Applicant: Stephen B. Maguire, West Chester, PA (US)

(72) Inventor: Stephen B. Maguire, West Chester, PA (US)

( * ) Notice: Subject to any disclaimer, the term of this patent is extended or adjusted under 35 U.S.C. 154(b) by 0 days.

(21) Appl. No.: 14/886,442

(22) Filed: Oct. 19, 2015

(65) Prior Publication Data

US 2016/0040661 A1     Feb. 11, 2016

Related U.S. Application Data

(63) Continuation-in-part of application No. 13/913,375, filed on Jun. 7, 2013, now Pat. No. 9,188,118, and a continuation-in-part of application No. 14/168,731, filed on Jan. 30, 2014, now abandoned, and a continuation-in-part of application No. 14/587,921, filed on Dec. 31, 2014, and a continuation-in-part of application No. 14/617,035, filed on Feb. 9, 2015, and (Continued)

(51) Int. Cl.

| F04B 43/02 | (2006.01) |
|---|---|
| F04B 49/06 | (2006.01) |
| F04B 53/16 | (2006.01) |
| B05C 17/01 | (2006.01) |
| A47K 5/12 | (2006.01) |
| F04B 43/04 | (2006.01) |
| F16N 13/16 | (2006.01) |

(52) U.S. Cl.
CPC .......... *F04B 43/02* (2013.01); *F04B 49/065* (2013.01); *F04B 53/16* (2013.01); *A47K 5/1217* (2013.01); *B05C 17/0103* (2013.01); *F04B 43/04* (2013.01); *F04B 49/06* (2013.01); *F16N 13/16* (2013.01)

(58) Field of Classification Search
CPC ... F16N 13/16; B05C 17/0103; A47K 5/1217; F04B 43/04; F04B 53/16; F04B 49/065; F04B 43/02; F04B 49/06
See application file for complete search history.

(56) References Cited

U.S. PATENT DOCUMENTS

| 600,233 A | 3/1898 | Palm |
|---|---|---|
| 1,451,759 A | 4/1923 | Bruhn |

(Continued)

FOREIGN PATENT DOCUMENTS

| CN | 2809263 Y | 8/2006 |
|---|---|---|
| DE | 3433693 A1 | 3/1986 |

(Continued)

OTHER PUBLICATIONS

Forty-four page two-sided brochure including cover and back pages entitled "Maguire: Auxiliary equipment for the plastics industry" of Maguire Products, Inc., Oct. 2000.

(Continued)

*Primary Examiner* — Frederick C Nicolas
(74) *Attorney, Agent, or Firm* — Fox Rothschild LLP

(57) ABSTRACT

A pneumatically powered pump for liquid color adapted to fit partially within a liquid color container having a body portion of the pump within the liquid color container adapted to be mounted on the underside of the container lid and being a single piece of molded plastic overlying an aperture in the container lid.

8 Claims, 16 Drawing Sheets

Related U.S. Application Data a continuation-in-part of application No. 14/700,911, filed on Apr. 30, 2015.

(60) Provisional application No. 61/660,326, filed on Jun. 15, 2012.

(56) References Cited

U.S. PATENT DOCUMENTS

| | | |
|---|---|---|
| 1,482,376 A | 2/1924 | Anderson |
| 1,489,348 A | 4/1924 | Hampton |
| 2,188,646 A | 1/1940 | Bunch |
| 2,199,657 A | 5/1940 | Bunch |
| 2,387,233 A | 10/1945 | Clapp |
| 2,606,696 A | 8/1952 | Miner |
| 2,656,828 A | 10/1953 | Conover |
| 2,665,825 A | 1/1954 | Poitras et al. |
| 2,701,881 A | 2/1955 | McGee |
| 2,873,892 A | 2/1959 | Nelson et al. |
| 2,909,315 A | 10/1959 | Sampietro |
| 2,956,822 A | 10/1960 | Kates |
| 3,391,645 A | 7/1968 | Koza |
| 3,477,698 A | 11/1969 | Smith et al. |
| 3,518,033 A | 6/1970 | Anderson |
| 3,785,412 A | 1/1974 | Stone |
| 3,814,388 A | 6/1974 | Jakob |
| 3,883,275 A | 5/1975 | Browne |
| 3,957,399 A | 5/1976 | Siczek |
| 3,988,088 A | 10/1976 | King et al. |
| 3,998,103 A | 12/1976 | Bjorklund et al. |
| 4,046,495 A * | 9/1977 | Grimm, Jr. ........... B05B 1/3436 222/385 |
| 4,185,948 A | 1/1980 | Maguire |
| 4,469,127 A | 9/1984 | Kitamura |
| 4,473,173 A | 9/1984 | DeGroff et al. |
| 4,501,405 A | 2/1985 | Usry |
| 4,571,416 A | 2/1986 | Jarzombeck et al. |
| 4,586,882 A | 5/1986 | Tseng |
| 4,605,297 A | 8/1986 | Livingston et al. |
| 4,606,710 A | 8/1986 | Maguire |
| 4,621,990 A | 11/1986 | Forsythe et al. |
| 4,657,490 A | 4/1987 | Abbott |
| 4,759,189 A | 7/1988 | Stropkay |
| 4,834,071 A | 5/1989 | Hosoi et al. |
| 4,921,132 A | 5/1990 | Wales |
| 4,967,940 A | 11/1990 | Blette et al. |
| 5,039,279 A | 8/1991 | Natwick et al. |
| 5,116,547 A | 5/1992 | Tsukahara et al. |
| 5,199,852 A | 4/1993 | Danby |
| 5,215,215 A | 6/1993 | Sauer |
| 5,225,210 A | 7/1993 | Shimoda |
| 5,344,232 A | 9/1994 | Nelson et al. |
| 5,364,242 A | 11/1994 | Olsen |
| 5,609,191 A | 3/1997 | Topping |
| 5,622,392 A | 4/1997 | Gochenouer |
| 5,853,244 A | 12/1998 | Hoff et al. |
| 5,953,923 A | 9/1999 | Davies |
| 5,980,490 A | 11/1999 | Tsoukalis |
| 5,984,777 A | 11/1999 | Kuchar |
| 5,988,983 A | 11/1999 | Furusawa |
| 6,007,236 A | 12/1999 | Maguire |
| 6,057,514 A | 5/2000 | Maguire |
| 6,188,936 B1 | 2/2001 | Maguire et al. |
| 6,213,739 B1 | 4/2001 | Phallen et al. |
| 6,386,841 B1 | 5/2002 | Probst |
| 6,402,363 B1 | 6/2002 | Maguire |
| 6,502,013 B1 | 12/2002 | Sosnik |
| 6,523,451 B1 | 2/2003 | Liao |
| 6,599,005 B2 | 7/2003 | van Der Wei |
| 6,669,358 B2 | 12/2003 | Shimoda |
| 6,719,453 B2 | 4/2004 | Cosman et al. |
| 6,880,965 B1 | 4/2005 | Sheffield, Jr. |
| 6,991,004 B2 | 1/2006 | Kaufhold et al. |
| 7,118,349 B2 | 10/2006 | Oglesby |
| 7,154,069 B1 | 12/2006 | Gordon |
| 7,201,290 B2 | 4/2007 | Mehus |
| 7,311,882 B1 | 12/2007 | Renzi |
| 7,390,119 B2 | 6/2008 | Maguire |
| 7,416,096 B2 | 8/2008 | Maguire |
| 7,594,717 B2 | 9/2009 | Sheinman |
| 7,958,915 B2 | 6/2011 | Maguire |
| 7,980,834 B2 | 7/2011 | Maguire |
| 8,042,578 B2 | 10/2011 | Post |
| 8,627,852 B2 | 1/2014 | Hatton |
| 8,757,217 B2 | 6/2014 | Maguire |
| 8,800,821 B2 | 8/2014 | Maguire et al. |
| 9,188,118 B2 | 11/2015 | Maguire |
| 2002/0023449 A1 | 2/2002 | Park et al. |
| 2002/0031822 A1 | 3/2002 | Van Der Wei et al. |
| 2002/0122103 A1 | 9/2002 | Yamamoto et al. |
| 2002/0189667 A1 | 12/2002 | O'Dougherty et al. |
| 2003/0071868 A1 | 4/2003 | Koshikawa et al. |
| 2003/0142580 A1 | 7/2003 | Maguire |
| 2003/0218014 A1 | 11/2003 | Gregory et al. |
| 2005/0052945 A1 | 3/2005 | Maguire |
| 2005/0126638 A1 | 6/2005 | Gilbert |
| 2006/0067844 A1 | 3/2006 | Iversen |
| 2007/0071624 A1 | 3/2007 | Brewer |
| 2010/0322644 A1 | 12/2010 | Ajima |
| 2011/0200464 A1 | 8/2011 | Maguire et al. |
| 2012/0195771 A1 | 8/2012 | Brandis |
| 2012/0260992 A1 | 10/2012 | Maguire |
| 2013/0334258 A1 | 12/2013 | Maguire |
| 2014/0087035 A1 | 3/2014 | Cummings |
| 2014/0147288 A1 | 5/2014 | Maguire |
| 2014/0224830 A1 | 8/2014 | Maguire |
| 2015/0020713 A1 | 1/2015 | Maguire |
| 2015/0066794 A1 | 3/2015 | Maguire et al. |
| 2015/0108748 A1 | 4/2015 | Maguire |
| 2015/0165662 A1 | 6/2015 | Maguire |
| 2016/0040661 A1 | 2/2016 | Maguire |

FOREIGN PATENT DOCUMENTS

| | | |
|---|---|---|
| FR | 1 477 595 A | 4/1967 |
| GB | 1145752 | 3/1969 |
| JP | 3550699 B2 | 8/2004 |
| WO | WO 01/49374 A1 | 7/2001 |
| WO | WO2015/089499 | 6/2015 |

OTHER PUBLICATIONS

Two-sided color brochure entitled Maguire: Model MPA Liquid Color Pump, Maguire Products, Inc., published Dec. 28, 1995.
International Search Report for PCT/US02/02934, dated Feb. 20, 2003.
Written Opinion for PCT/US02/02934, dated Mar. 24, 2003.
International Search Report for PCT/US11/021994, dated May 24, 2011.
Written Opinion for PCT/US11/021994, dated May 24, 2011.
Thirty-two page catalog entitled "Maguire Color Blending Equipment" published by Maguire Products, Inc., 1993, United States.
International Search Report for PCT/US2014/070264 dated Apr. 15, 2015.
Written Opinion for PCT/US2014/070264 dated Apr. 15, 2015.
International Search Report for PCT/US2014/053391 dated Jan. 29, 2015.
Written Opinion for PCT/US2014/053391 dated Jan. 29, 2015.
Wayback Machine of SMC Linear Actuators Sep. 11, 2011, SMC, Accessed on Apr. 6, 2016.
Wayback Machine of SMC Linear Actuator C02 Series Catalog, Sep. 11, 2011, SMC, Accessed on Apr. 6, 2016.

* cited by examiner

MOLDED DIAPHRAGM LIQUID COLOR PUMP

CROSS-REFERENCE TO RELATED PATENT APPLICATIONS

This patent application is a continuation-in-part of U.S. patent application Ser. No. 13/913,375 filed 7 Jun. 2013 in the name of Stephen B. Maguire and published as US 2013/0334258 A1, the priority of which is claimed under 35 USC 120. The '375 application claims the benefit of the priority under 35 USC 119 and 35 USC 120 of provisional U.S. patent application Ser. No. 61/660,326 filed 15 Jun. 2012 in the name of Stephen B. Maguire and entitled "Molded Diaphragm Pump."

This patent application is further a continuation-in-part of U.S. patent application Ser. No. 14/168,731 filed 30 Jan. 2014 in the name of Stephen B. Maguire and entitled "Pump Actuator and Method for Pump Operation." The '731 application, published as U.S. 2014/0147288 on 29 May 2014, is a continuation-in-part of the '375 application and claims the benefit of the priority of the '375 application, and similarly to the applications mentioned above, also claims the benefit of the priority of the '326 application. The instant application similarly claims the benefit of the priority of the '326 application under 35 USC 119 and 120 through the parent '375 and '731 applications noted above.

This patent application is also a continuation-in-part of U.S. patent application Ser. No. 14/587,921 filed 31 Dec. 2014 in the name of Stephen B. Maguire and entitled "Multiple Plate Quick Disconnect Fitting." The '921 application is a continuation-in-part of the '375 application and claims the benefit of the priority of the '375 application and similarly though that application claims the benefit of the priority of the '326 application under 35 USC 119 and 120.

This patent application is further a continuation-in-part of U.S. patent application Ser. No. 14/617,035 filed 9 Feb. 2015 in the name of Stephen B. Maguire and entitled "Quarter Turn Adapter Connective Outlet Fitting for Liquid Color Dispensing" and claims the benefit of the priority of not only the '035 application, but also the '921 and '375 applications and through them the benefit of the priority of the '326 application, under 35 USC 119 and 120.

This patent application is still further a continuation-in-part of U.S. patent application Ser. No. 14/700,911 filed 30 Apr. 2015 in the name of Stephen B. Maguire and entitled "Pulsed Pneumatic Control of Liquid Color Pumps" and claims the benefit of the priority of the '911 application, but also the '035, '921, '375, and '326 applications under 35 USC 119 and 120.

The disclosures of all of these preceding applications are hereby incorporated by reference in their entireties, to the extent permitted under applicable law.

BACKGROUND OF THE INVENTION

Field of the Invention

This invention relates to liquid color used to color molded and extruded plastic parts during fabrication thereof, and more particularly relates to diaphragm pumps for pumping liquid color, and even more specifically to diaphragm pumps for pumping liquid color where the pump is equipped with a quick release mechanism so that the pump can be quickly removed from a container of liquid color to which the pump is attached, for rapid changeover when the liquid color container is empty, or a change in color is desired.

Description of the Prior Art

Pumps for liquid color are known, with one such pump being disclosed in U.S. Pat. No. 7,416,096, with another being disclosed in U.S. Pat. No. 7,980,834, and yet another being disclosed in U.S. Pat. No. 8,800,821. The disclosures of U.S. Pat. Nos. 7,416,096, 7,980,834, and 8,800,821 are hereby incorporated by reference.

The '096 patent discloses a container of liquid color material having a diaphragm liquid color pump located in the container for providing liquid color from the container. The diaphragm liquid color pump is located in the container at the container bottom, where the pump can collect liquid color as the container empties. The pump is driven by a pneumatic piston-cylinder combination located outside the container, with a shaft extending downwardly from the pneumatic piston-cylinder combination to the diaphragm pump, to reciprocate the diaphragm back and forth to effectuate pumping action.

The apparatus disclosed in '096 is relatively low in cost. The apparatus includes a liquid-tight fitting allowing the liquid color output from the pump to be supplied directly to a plastics material processing machine, for the liquid color to impart color directly to plastic parts as they are manufactured.

The '834 apparatus provides pressure boosting, permitting liquid color to be injected into an extruder screw or a molding machine screw barrel at a position downstream from the throat, closer to the position at which the finished plastic parts are molded or extruded.

The '821 patent discloses a disposable low-cost pump in a container for liquid color, where the pump is fabricated from a plurality of PVC tubular members connected in a way to provide a pumping chamber. A piston is displaceable into the pumping chamber. A spring biases the piston outwardly from the chamber, in opposition to force applied by an air cylinder.

While these devices all have merit and all have proved commercially successful, there is a continuing need for even lower cost, even higher reliability apparatus to provide liquid color from liquid color containers to injection and compression molding machines and to extruders, to color plastic parts in the course of manufacture thereof. Moreover, there is a need to regulate flow of liquid color by regulating the pump in order to provide the most accurate flow of liquid color into the molding machine or extruder.

While disposable pumps for liquid color are known in the sense that those pumps can be removed from the liquid color containers and discarded, there is a need for a pump that fits integrally with a liquid color container in a manner to be a part of the container so that the complete, assembled pump cannot be removed without compromising the container and leaving an open hole. This is to discourage pump scavenging.

There is a further need, which is somewhat inconsistent with the foregoing, for the relatively high cost portions of the pump to be easily and quickly removable once the container has been emptied, so that those high cost portions of the pump may be used with a new, full container of liquid color, while low cost portions of the pump remain with an empty container to prevent flow of any remaining liquid color out of the container, and may be used when the container is refilled and the pump is reassembled to pump liquid color from the new container.

SUMMARY OF THE INVENTION

In one of its aspects, this invention provides a diaphragm pump for liquid color, where a body portion of the pump is molded and formed of a single piece of plastic. The molded body portion of the pump is preferably incorporated into the liquid color container lid as a part of the container lid design. The diaphragm portion of the pump, when in operation, moves from an unflexed "rest" or "up" position to a flexed "down" position, with total movement at the diaphragm center desirably being in the order of about one-quarter of an inch.

The thickness of the container lid is preferably used to provide space for the diaphragm, with the diaphragm being located in space created by removal of a portion of the container lid. The molded body portion of the pump and the diaphragm preferably are mounted on the bottom side of the container lid. The space created in the course of design of the container lid allows the diaphragm to flex upwardly into that space as needed.

The diaphragm is preferably powered by air supplied through a quick disconnect fitting, allowing an air supply to be easily connected and removed so that an empty liquid color container can be removed from the powered portion of the pump and replaced by a fresh container filled with liquid color. The quick disconnect fitting can be quickly connected to the fresh container having a similar diaphragm receiving space and molded pump body portion in place, and liquid color pumping quickly resumes.

The pump desirably includes a potentiometer, preferably a linear potentiometer, allowing detection of diaphragm movement and accurate control of the pump using a feedback signal provided to a controller, preferably a microprocessor.

In yet another one of its aspects, this invention provides a liquid color container having a pneumatic pump, where the container has a lid with an aperture therein. An integral molded plastic one-piece pump lower body portion resides within the container and is connected to the lid. A diaphragm is sandwiched between the integral molded plastic one-piece pump lower body portion and the lid, in a location to overlie the aperture in the lid. The diaphragm is moveable away from the lid responsively to preferable pneumatic pressure applied to the side of the diaphragm facing the lid and is moveable towards the lid and into the aperture in the lid upon relief of such pneumatic pressure.

In still another one of its aspects, this invention provides a method for operating a pump having a moveable pumping member within a pumping chamber, where the method preferably includes positioning a moveable reciprocable member in contact with a pumping member to move reciprocally in concert with the pumping member. In this aspect, the invention preferably proceeds with sensing position of the reciprocable member, which is indicative of the position of the pumping member, and producing a signal indicative thereof. The method then preferably proceeds in this aspect by periodically applying force to the pumping member to move the pumping member and thereby effectuate pumping of liquid from the chamber. The method preferably further involves using the signals to regulate frequency of force application to the pumping member to achieve a preselected rate of output from the pump.

Addition of color to a plastic molding or processing operation requires careful metering, which this invention provides. When such color is added, the rate of color dispensing must exactly match the rate requirement of the process machine. Consequently, speed of the liquid color pumping process must be carefully controlled. In the invention, rate of pumping is controlled and even partial pumping strokes may be effectuated by preferably pulsing very small bursts of air into the liquid color pump above the diaphragm portion of the pump. By regulating the duration of each air pulse and regulating the time between air pulses, the invention meters liquid color at a desired precisely controlled flow rate.

In one of its aspects, the invention provides continuous feedback of the exact position of a liquid color pump diaphragm at all times as air pushes the diaphragm downward during the pumping stroke. Such continuous feedback information regarding the exact position of the diaphragm at all times allows preferable continuous monitoring and correction of liquid color flow rate by regulation of the frequency and duration of the air pulses applied to the diaphragm and also facilitates accurate, partial strokes of the pumping diaphragm. The invention accomplishes this by preferably providing a moveable pin that follows the diaphragm of the liquid color pump as the diaphragm moves down and up. The invention further accomplishes this by using a linear potentiometer in a position so that the potentiometer is within an actuator portion of the pump and senses movement of the pin.

In a typical application, total movement of the diaphragm portion of the liquid color pump is preferably about one-quarter of one inch. The preferred slide potentiometer portion of the actuator is preferably capable of about 20 millimeters, or about three-quarters of an inch, of movement of the sensing slide of the potentiometer. In the course of practice, the upper and lower limits of potentiometer movement are preferably recorded in real time using a microprocessor and readings in between these upper and lower limits are preferably used in real time to calibrate the actuator to determine the precise location of the pin and hence of the diaphragm as the diaphragm moves up and down and pumps the liquid color.

In the preferred operation of the invention, the invention utilizes only about one-quarter inch of the total available range of diaphragm movement, which translates into about 300 different position readings of the moveable potentiometer arm, and hence the position of the pin riding the diaphragm, and therefore the position of the diaphragm itself, thereby assuring precise location information at all times respecting the position of the pumping diaphragm.

In a preferred manifestation of the invention, the potentiometer preferably is entirely within a chamber interior of the actuator portion of the pump, which chamber is pressurized. Electrical signals from the potentiometer are brought out of the actuator and out of the pressurized chamber within the actuator preferably via screws, which make contact with the potentiometer connections inside the actuator and which are themselves sealed against air leakage where they enter the actuator body. The absence of any moving, sliding seals assures correct operation of the potentiometer and actuator for many years with there being no wear points to fail.

A light spring, above the slide arm of the potentiometer and biasing the actuator pin downwardly, assures that the potentiometer slide arm or "T-bar" and the actuator pin follow the diaphragm downwardly as air pushes the diaphragm down.

The actuator is removable from the remainder of the pump using a one-quarter turn locking system with an O-ring base. This allows the actuator to be installed or removed easily and frequently, while effectively sealing the actuator against the pump surface whenever the actuator is installed.

The method aspect of the invention preferably further includes recording signals at the extremities of actuator pin travel, using those signals and the known length of actuator pin travel to determine location of the actuator pin based on the signal received at a given time, and adjusting the frequency of application of force to the pumping diaphragm according to the location of the actuator pin and the potentiometer slide arm or T-bar, to maintain the desired output of liquid color from the pump.

The method may further involve using the signals and known distance of the actuator pin travel to determine location of the actuator pin based on a signal received at a given time and may further include determining the relationship between duration of force application to the pumping diaphragm and pumping diaphragm displacement.

In another one of its aspects, this invention provide apparatus for controlling a moveable pumping member and a pump, where the apparatus includes a housing, a reciprocally moveable pin slidably residing within the housing, with the pin having an extremity portion passing through the housing for contacting the moveable pumping diaphragm and moving unitarily with the moving pumping diaphragm. The apparatus aspect of the invention further preferably includes a potentiometer connected to and residing within the housing for sensing movement of the pin and producing a signal indicative thereof, and spring for biasing the pin against the pumping member. A microprocessor is also included, as is at least one solenoid valve, for regulating air bursts applied to the diaphragm to facilitate pumping.

In this apparatus aspect of the invention, the housing may have a first aperture for connection to a supply of pulsed air, where the housing is otherwise sealed and air tight except for passage of air (that powers the diaphragm) along the pin towards the diaphragm where the pin passes through the housing.

The potentiometer desirably has a moveable slide arm or T-bar portion positioned between and contacting both the light upper spring and the pin. The actuator housing is preferably at least partially polymer foam. The signals are desirably electrical signals and the potentiometer desirably has terminals providing the output electrical signals indicative of movement of the pin.

The apparatus preferably further comprises signal carriers electrically connected to terminals passing through the housing, and electrical connectors mounted on the housing exterior, which are electrically connected to the signal carriers, for connection to a microprocessor, to in turn activate the one or more solenoid valves to apply bursts of pumping air to the diaphragm. In the apparatus aspect of the invention, the pumping member is desirably a diaphragm.

In a preferred practice of the invention, a series of very short electrical pulses is applied to a solenoid valve arrangement, which opens and closes a supply of pressurized air which is applied to the diaphragm for very short periods, usually about $1/100^{th}$ of a second for each electrical pulse. These short electrical pulses, when applied to the solenoid valve(s) arrangement, with the solenoid valve(s) arrangement in turn applying corresponding individual pulses of air under pressure to a diaphragm within the pump, results in delivery of just enough air to displace the diaphragm a small distance, against force applied by a spring, with the diaphragm moving preferably about $5/100^{th}$ of an inch (0.050) with each pulse.

In the most preferred operation, the invention utilizes only about one-quarter inch of the diaphragm movement, which translates into about 300 different position readings of a moveable potentiometer arm, and hence the position of a pin riding the diaphragm, and therefore the position of the diaphragm itself, thereby assuring precise location information at all times respecting the position of the pumping diaphragm.

The invention preferably varies the overall metering rate of liquid color when needed, preferably by changing the time between pulses. Longer "on" time durations for each pulse result in lower liquid color metering rates, while shorter "off" time durations between each pulse result in higher liquid color metering rates.

The method aspect of the invention may preferably further include recording signals at the extremities of pin travel, using those signals and the known distance of pin travel to determine location of the pin based on a signal received at a given time and adjusting the frequency of application of force to the pumping diaphragm according to the location of the pin and the potentiometer slide arm or T-bar, to maintain the desired output of liquid color from the pump.

The method may further use the signals and the known distance of pin travel to determine location of the pin based on a signal received at a given time and may further include determining the relationship between the duration of force application to the pumping diaphragm and displacement of the pumping diaphragm.

In another of its many aspects, this invention provides a liquid color pump including a diaphragm displaceable into a chamber to displace liquid color therefrom; a pair of solenoid valves, with each valve having an inlet port, an exhaust port, a first supply port connecting to the inlet port when the valve is energized, and a second supply port connecting to the inlet port when the valve is not energized. A first one of the valves has its inlet port connected to a compressed air supply, its first supply port connected to the diaphragm, its second supply port blocked and its exhaust port connected to the inlet port of the second valve. The second valve has its output port connected to atmosphere.

In yet another one of its aspects, this invention provides a liquid color pump having a diaphragm displaceable into a chamber for displacing liquid color therefrom; a pair of solenoid valves each having an inlet port, an exhaust port and an output port connected to the inlet port when the valve is energized but connected to the exhaust port when the valve is not energized. A first one of the valves has its inlet port connected to a compressed air supply; its output port connected to the diaphragm; and its exhaust port connected to the inlet port of the second valve, with the second valve having its output port connected to atmosphere. In this aspect of the invention, the liquid color pump further includes a potentiometer sensing displacement position of the diaphragm and a processor actuating the solenoid valves responsively to diaphragm position sensed by the potentiometer.

In still yet another one of its aspects, this invention provides a liquid color pump comprising a diaphragm displaceable into a chamber to displace liquid color therefrom, a solenoid valve for releasing repeated bursts of air to displace the diaphragm into the chamber, a potentiometer for sensing displacement position of the diaphragm; and a processor for repeatedly actuating the solenoid valve to provide the repeated bursts of air responsively to diaphragm position sensed by the potentiometer. The solenoid valve preferably has an inlet port connected to a supply of compressed air and an outlet port that upon valve energization is connected to the diaphragm for flow of compressed air flow therethrough, from the supply to the diaphragm, to displace the diaphragm for pumping action of liquid color. Upon de-energization of the solenoid valve, the outlet port connected to the diaphragm is connected to an exhaust port.

In another one of its aspects, the invention provides a liquid color pump having a diaphragm displaceable into a chamber to displace liquid color therefrom, a first solenoid valve when energized supplying compressed air from a supply to the diaphragm and when de-energized connecting the diaphragm to an exhaust port; a second solenoid valve which when energized connects the exhaust port of the first solenoid valve to atmosphere; a potentiometer for sensing displacement position of the diaphragm; and a processor for actuating the solenoid valve responsively to diaphragm position sensed by the potentiometer.

The control aspect of this invention preferably incorporates one or two solenoid valves opening and closing to apply pressurized air against the diaphragm. When two solenoids are used, one solenoid is pulsed "on" for a precise short interval, typically 10 microseconds. These pulses are separated by an "off" time that can be from a very short time period up to several seconds. The "off" time interval controls overall flow rate of liquid color to a process machine such as an extruder or a molding press.

A linear potentiometer preferably detects diaphragm position by preferably detecting the exact position of the riding piston, from fully retracted to fully extended. By monitoring this position and using the position feedback information, a microprocessor controlling the pumping operation can adjust the pulse "on" time, the pulse "off" time, and the number of pulses, to achieve the desired metering amount and the desired rate of delivery of liquid color to a process machine.

The microprocessor controller allows input of all process information required for regulating the process, namely the process machine rate of consumption of granular plastic resin material in pounds per hour, the percent by weight of liquid color to be added to the granular plastic resin material, the weight of the liquid color pumped in pounds per gallon, and the volume displaced by the liquid color pump for each application of pressurized air to the diaphragm.

Knowing the process rate and the weight or volume percentage (and density of the liquid color in the case of volume percentage) of liquid color to be added to the granular plastic resin to be molded or extruded allows calculation of the amount and rate of liquid color to be supplied in terms of grams of liquid color per hour. Knowing the density, namely weight of liquid color in pounds per gallon, allows for conversion from grams of liquid color to volume of liquid color in cubic centimeters.

In still another of its aspects, this invention provides a quick disconnect multiple plate sandwich assembly that is particularly adapted for connecting two conduits together with at least one of the conduits being within a structure to which the sandwich assembly is secured, preferably by bolts, for flow of liquid color therebetween and facilitates rapid connection and disconnection of liquid color input fittings and liquid color output fittings to and from a liquid color pump or other device. The quick disconnect sandwich assembly fitting includes a first plate, a second plate, and a third plate. The three plates when assembled are superimposed on top of one another to form a sandwich structure, with the second plate positioned between the first plate and the third plate.

Each of the plates includes at least one circular arcuate interior opening, with all of the associated, corresponding openings on the respective plates formed on a common center. Desirably, each of the plates has two openings, one being larger than the other. The larger openings in each of the plates are referred to herein as being "associated" with corresponding larger openings that are present in each of the other two plates. Desirably, each of the plates also includes a smaller opening. The smaller openings are also referred to herein as being "associated" with corresponding smaller openings that are desirably present in each of the other two plates.

The diameter of a larger arcuate interior opening of the first plate, sometimes referred to herein as the "base" plate, is preferably the smallest of the three associated larger arcuate interior openings. The diameter of the larger arcuate interior opening of the second plate, sometimes referred to herein as the "spacer" plate, is the largest of the three associated larger arcuate interior openings. The diameter of the larger arcuate interior opening of the third plate, sometimes referred to herein as the "retainer" plate, is larger than that of the associated larger opening in the first plate and smaller than that of the associated large opening in the second plate.

The retaining aspect of the invention is preferably provided by interplay of the structures of the second and third plates and a conduit or conduit housing that is removably connected to the second and third plates. The second plate preferably includes a pair of inwardly facing stops positioned oppositely one another on the larger arcuate interior opening. The third plate preferably includes a pair of arcuate guides formed in the larger arcuate interior opening, with each guide having a leading end and a trailing end. Receptors located at the leading end of each guide are axially displaced from a first surface of the third plate, opposite the surface of the third plate that contacts the second plate. The receptors each have upper and lower surfaces, with the lower surfaces of the receptors at the receptor first extremities being displaced in the axial direction from the first surface of the third plate. The upper and lower surfaces of the receptors taper smoothly from the extremities of the receptors to a junction with the guide.

The first, second, and third plates desirably each include a smaller second arcuate opening. As with the larger first arcuate opening, the associated smaller second arcuate opening of the second plate includes a pair of inwardly facing stops positioned oppositely one from another on the smaller arcuate interior opening, and the third plate includes a pair of guides formed in an associated smaller arcuate interior opening, with each guide having a leading end and a trailing end. Similarly, receptors located at the leading end of each guide are axially displaced from a first surface of the third plate opposite the surface contacting the second plate.

In still yet another of its aspects, this invention provides a quarter turn adapter connective fitting for connecting two liquid color conduits for liquid color flow therebetween. This fitting includes a male portion adapted for connection to a first liquid color conduit, having a tubular interior portion for conveyance therethrough of liquid color, with the tubular portion having an annular exterior. The quarter turn adapter connective outlet fitting further includes a female portion adapted for connection to a second liquid color conduit such as the outlet conduit of a liquid color pump. The female member has an arcuate passageway therethrough for slidable engaging receipt of an annular exterior section of the male portion and preferably includes lugs for engaging a quick disconnect fitting that is preferably of the sandwich type described above.

The fitting preferably includes a generally cylindrical outer portion having a pair of outwardly extending arcuate lugs formed on a first end thereof. Lower surfaces of the lugs are preferably co-planar with the first end surface of the outer portion. Outwardly facing surfaces of the lugs preferably are curved and preferably parallel with the curved cylindrical outer surface of the outer portion. The lugs most desirably subtend angles of less than 90°.

The generally cylindrical outer portion preferably further has a first axial passageway extending through the outer portion. The first axial passageway preferably has first and second annular internal shoulders formed therein, located intermediate of the first and second ends of the outer portion. A second shoulder preferably defines an end of a cylindrical central portion of the first axial passageway. The second shoulder is preferably of larger diameter than the first shoulder and is the more proximate to the first end of the outer portion. The first axial passageway preferably has an undercut-shaped annular recess at the first end of the cylindrical outer portion.

The quarter turn adapter outlet fitting preferably further includes an inner portion having a cylindrical outer surface extending axially length-wise partway along the length of the inner portion. The inner portion preferably further includes an annular protrusion extending from terminus of the inner portion cylindrical outer surface to define a first end of the inner portion. The annular protrusion desirably is of a greater diameter at juncture with the inner portion cylindrical outer surface and is of lesser diameter remote from juncture with the inner portion cylindrical outer surface. The juncture preferably defines a perpendicular shoulder relative to the inner portion cylindrical outer surface.

The inner portion of the quarter turn adapter fitting preferably further includes a second axial passageway extending from the first end towards the second end of the inner portion, with the second axial passageway preferably having a lateral opening of lesser diameter in the annular protrusion proximate the first end of the inner portion. The second axial passageway has a preferably conical surface between the first end and a second end thereof to define a valve seat.

The quarter turn adapter fitting preferably further includes a first o-ring within the inner portion, positioned at juncture of a minimum diameter part of the conical surface and a tubular part of the second axial passageway. The adapter outlet fitting further includes a ball preferably residing on the conical surface and contacting the first o-ring and a spring preferably between the ball and the first annular internal shoulder, for biasing the ball against the first o-ring.

The cylindrical outer surface of the inner portion is preferably in facing complemental contact with the cylindrical central portion of the first axial passageway. A first end of the inner portion preferably abuts the second shoulder of the first axial passageway. The undercut shaped annular recess in the outer portion and the perpendicular shoulder of the annular protrusion of the inner portion preferably form an inset pocket at the first end of the fitting. This pocket preferably receives a second o-ring for sealing the fitting against the supply. The first and second axial passageways are preferably coaxial and communicate one with another.

In still yet another one of its aspects, this invention provides a quarter turn adapter connective fitting for connecting two liquid color conduits for liquid color flow therebetween. This fitting includes a male portion adapted for connection to a first liquid color conduit, having a tubular interior portion for conveyance therethrough of liquid color, with the tubular portion having an annular exterior. The quarter turn adapter connective outlet fitting further includes a female portion adapted for connection to a second liquid color conduit such as the outlet conduit portion of a liquid color pump. The female member has an arcuate passageway therethrough for slidable engaging receipt of an annular exterior section of the male portion and preferably includes lugs for engaging a quick disconnect fitting that is preferably of the sandwich type.

BRIEF DESCRIPTION OF THE DRAWINGS

In FIGS. 18 and 19 schematically illustrating solenoid valves 700, 702, lines and arrows have been provided within the rectangular boxes schematically denoting solenoid valves 700, 702. These lines denote the positioning of the valve internals as respecting connection of the inlet port, the exhaust port, the valve energized supply port and the valve non-energized supply port, according to the state of energization of the valve. For example, in FIG. 18, valve 700 has diagonal arrow from inlet port 700IN leading to valve energized supply port 700S-E, and a second diagonal arrow leading from valve non-energized supply port 700S-NE to valve exhaust port 700EX. These diagonal arrows indicate that when solenoid valve 700 is energized, which is the condition illustrated in FIG. 18, inlet port 700IN is connected to valve energized supply port 700S-E and non-energized valve supply port 700S-NE is connected to valve exhaust port 700EX. Still referring to FIG. 18, the arrows for solenoid valve 702 indicate that in this state, when solenoid valve 702 is not energized, inlet port 702IN is connected to valve non-energized supply port 702S-NE, and valve energized supply port 702S-E is connected to exhaust port 702EX.

In FIG. 19, the arrows indicating connection or lack of connection between the various ports of solenoid valves 700, 702 are reversed from that illustrated in FIG. 18, since in FIG. 19 solenoid valve 702 is energized and solenoid valve 700 is not energized.

DESCRIPTION OF THE PREFERRED EMBODIMENT AND BEST MODE KNOWN FOR PRACTICE OF THE INVENTION

Figure 1:
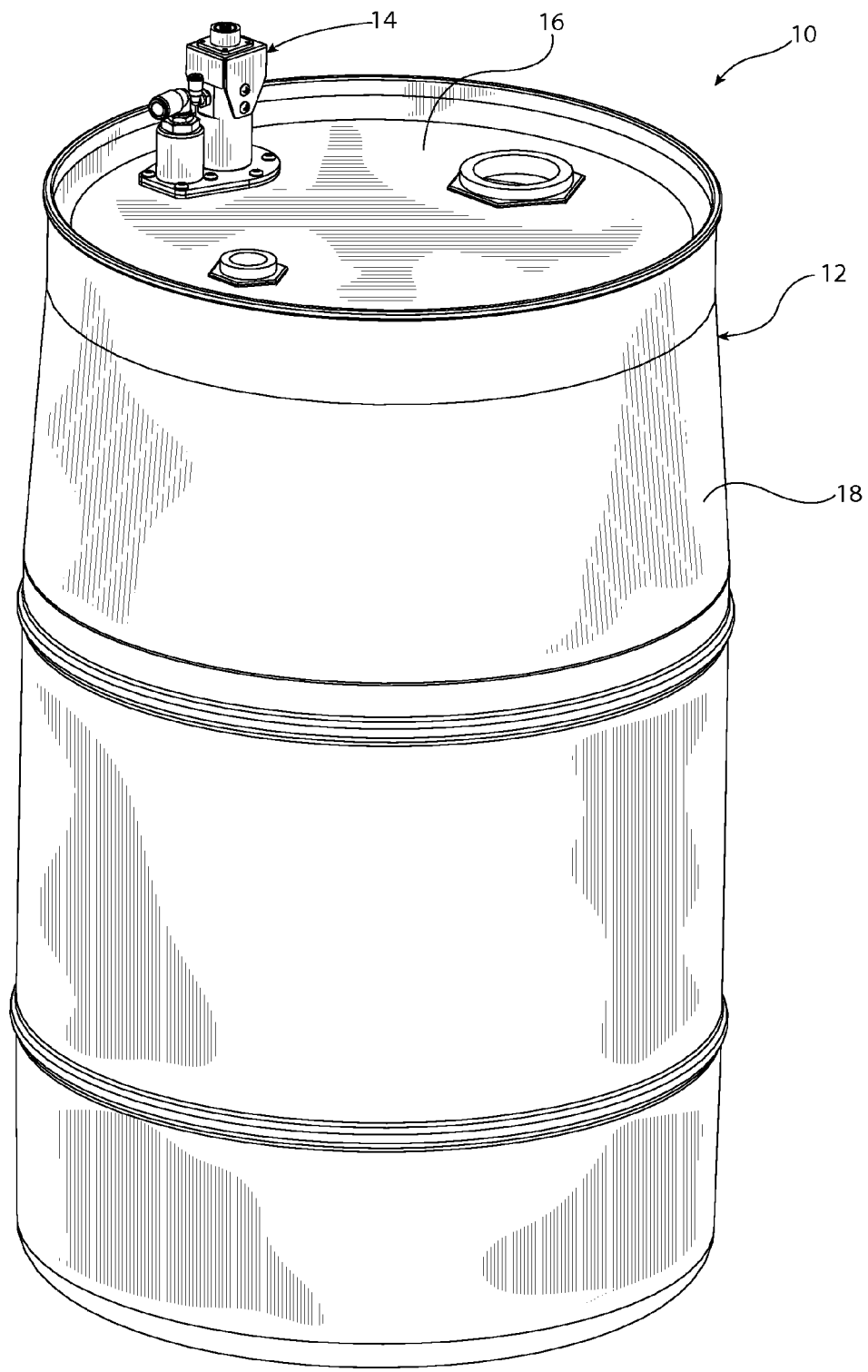
FIG. 1 is an isometric front view of a liquid color container having an injection molded diaphragm pump for liquid color with quick release in accordance the invention.
Figure 2:
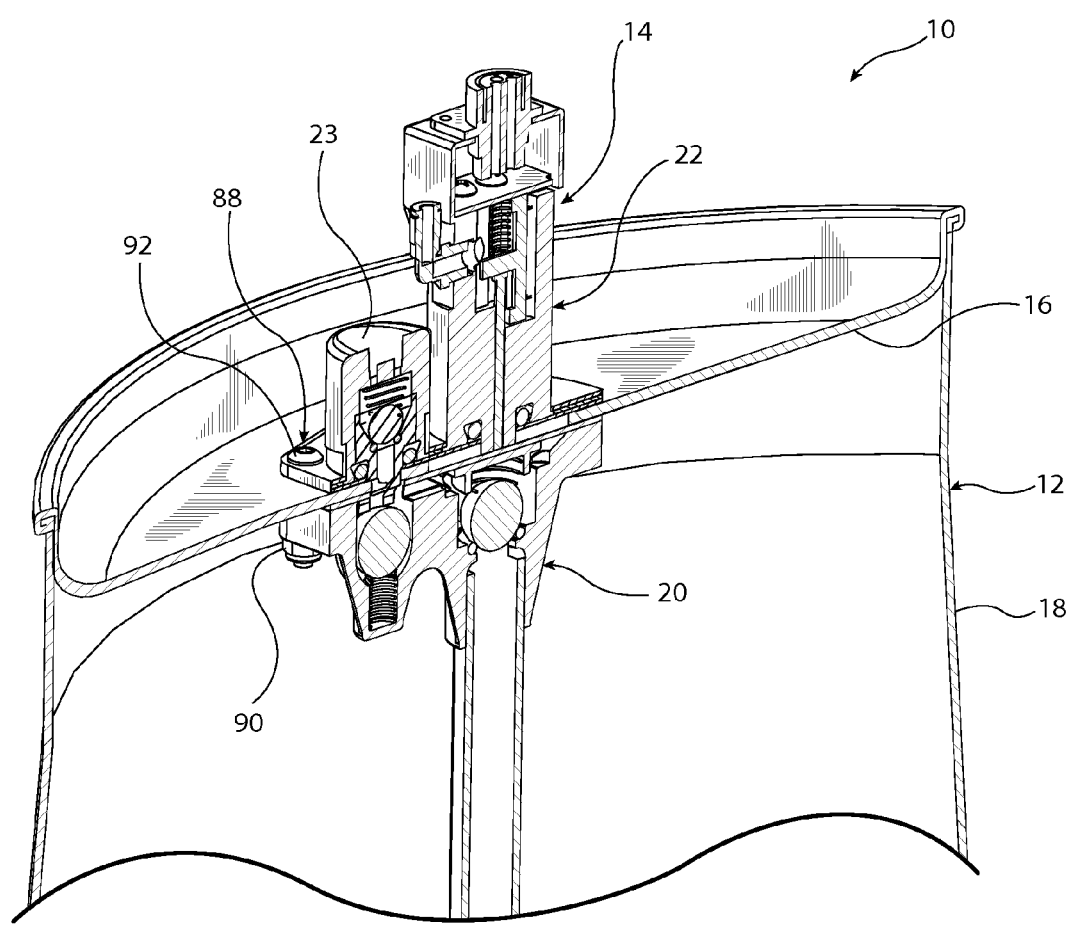
FIG. 2 is an isometric sectional view, with the section taken at an angle of forty-five degrees (45°) relative to the receiver, of the liquid color container having an injection molded diaphragm pump for liquid color with quick release as illustrated in FIG. 1.

Referring to the drawings in general and specifically to FIGS. 1 and 2, a liquid color container with a pneumatic pump is illustrated in FIGS. 1 and 2, where the pump-drum assembly is designated generally 10, the drum is designated generally 12 and the pump is generally designated generally 14. Drum 12 includes a drum lid 16 and a drum cylindrical body 18 both as illustrated in FIGS. 1 and 2.

Figure 3:
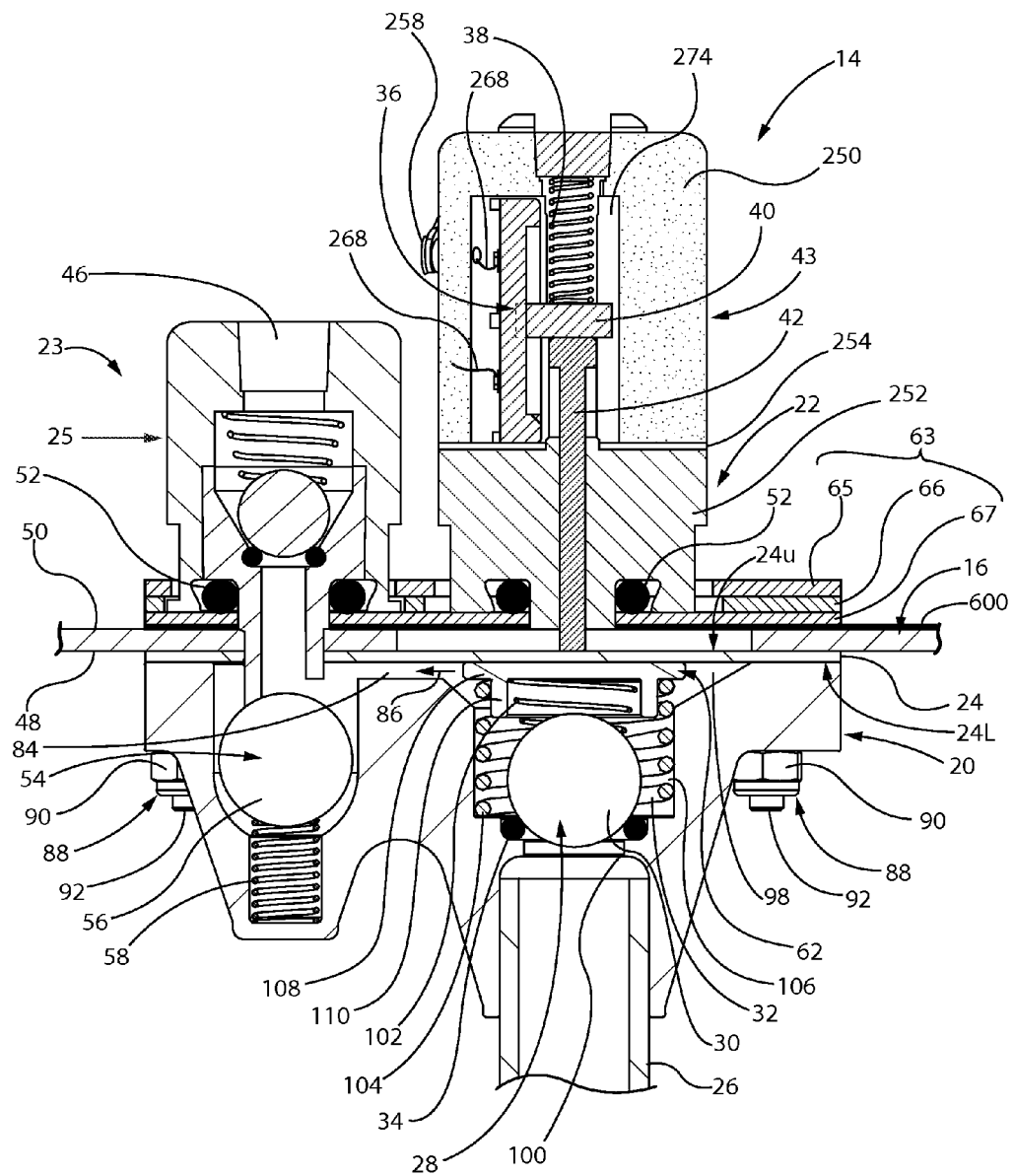
FIG. 3 is a sectional elevation view of the liquid color injection molded diaphragm pump for liquid color with quick release as illustrated in FIGS. 1 and 2.

Referring to FIGS. 2 and 3, pump 14 is mounted on lid 16 and secured thereto by nut and bolt combinations 88, one of which is illustrated in FIG. 2 and parts of which are visible in FIG. 3. Each nut and bolt combination 88 includes a nut 90 and a bolt 92, with the head of bolt 92 being exterior of drum 12 and nut 90 being within drum 12, as shown in FIGS. 2 and 3.

Figure 4:
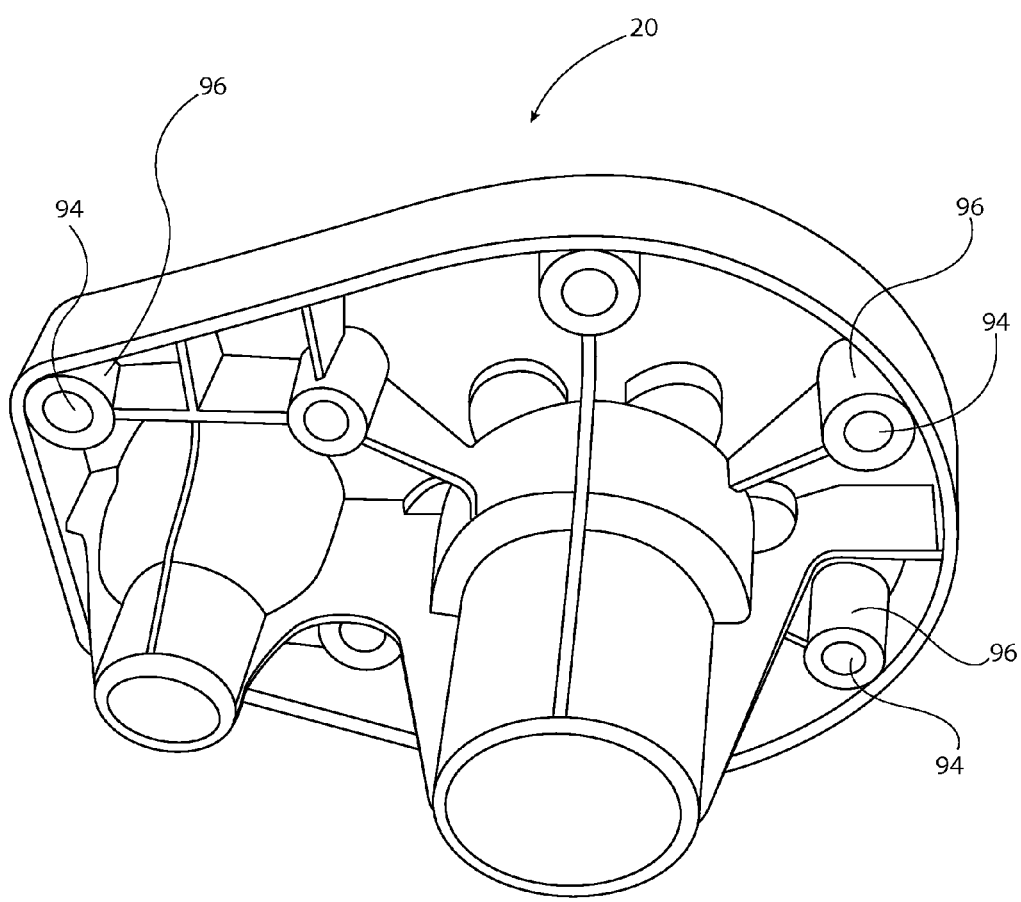
FIG. 4 is an enlarged isometric view of a bottom portion of the injection molded diaphragm pump for liquid color with quick release as illustrated in FIGS. 1, 2 and 3.
Figure 5:
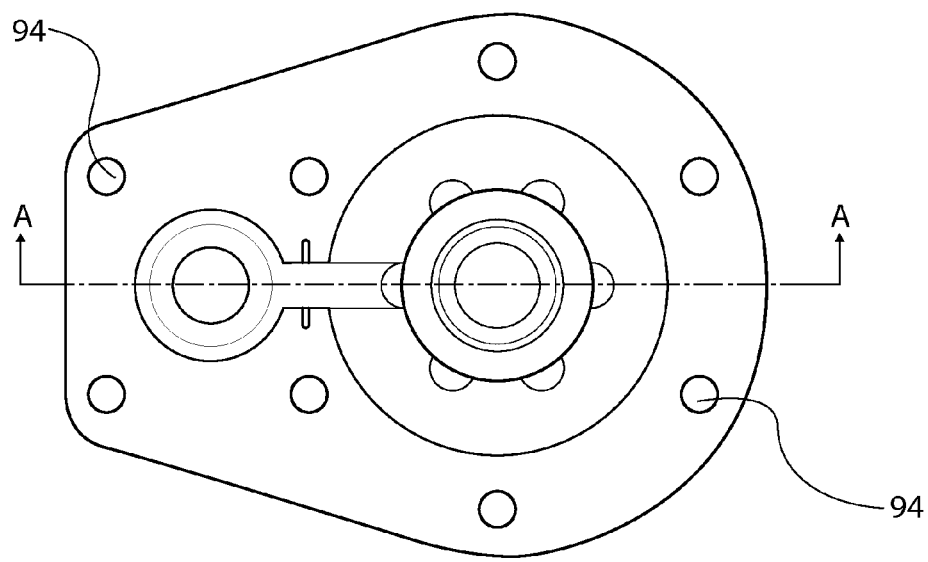
FIG. 5 is a bottom view of the molded plastic one piece lower body portion of the injection molded diaphragm pump illustrated in FIG. 4.

Still referring to FIG. 2 and to FIG. 3, pump 14 includes a pump inlet section 22, a pump outlet section 23, and a molded one piece lower body portion 20, which is illustrated in FIG. 4.

As illustrated in FIG. 3, bolts 92 pass through a collection of sandwiched plates 65, 66, 67, described in more detail below, that provide a quick release for pump inlet section 22 and pump outlet section 23, with bolts 92 further passing through an aperture in drum lid 16 and suitable openings 94 present in molded one piece lower body portion 20 of pump 14. Openings 94 in pump lower body portion 20 are formed in bosses 96 which result as one piece lower body portion 20 is molded. One piece lower body portion 20 is a single molded piece of plastic of integral construction. There is no assembly or fabrication activity involved as respecting finishing one piece lower body portion 20 and making it ready for incorporation into pump 14 once one piece lower body portion 20 is ejected from the mold of an injection molding machine. The only finishing that may occasionally be necessary is removal of any flash resulting from the molding process. Polyethylene is one preferred polymer for molding lower body portion 20.

Figure 6:
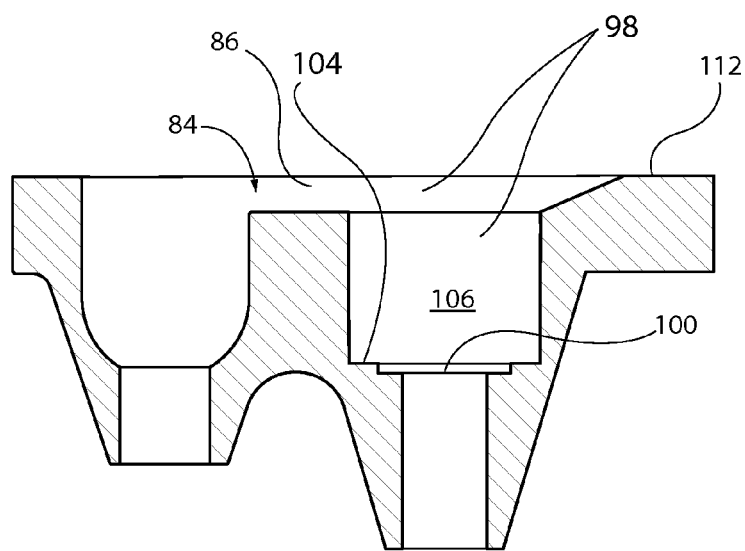
FIG. 6 is a sectional view of the molded plastic one piece lower body portion of the injection molded diaphragm pump illustrated in FIG. 5, with the section taken at lines and arrows A-A in FIG. 5.

Referring to FIGS. 3 and 6, diaphragm 24 is between an upper planar surface 112 of molded one piece lower body portion 20 and a part of the lower facing surface of drum lid 16, as best illustrated in FIG. 3.

A liquid color inlet conduit 26 extends downwardly from molded one piece lower body portion 20 and communicates with the open interior 98 of molded one piece lower body portion 20 via an inlet aperture 100 formed in molded one piece lower body portion 20. The open interior 98 and inlet aperture 100 formed in molded one piece lower body portion 20 are best illustrated in FIG. 6. A liquid color inlet check valve, located at liquid color inlet 100 to molded lower body portion 20, is designated generally 28 in FIG. 4 and includes a liquid color inlet check valve ball 30, which is biased against a liquid color inlet check valve seat 34, which seat is preferably defined by an O-ring. Bias for liquid color inlet check valve ball 30 is provided by liquid color inlet check valve bias spring 102.

Liquid color inlet check valve ball 30 resides within and is movable freely with respect to a diaphragm return spring designated 32 in FIG. 3. Diaphragm return spring 32 is positioned between and rests against a shoulder 104 of a cylindrically shaped portion 106 of the open interior of one piece lower body portion 20. Shoulder portion 104 and cylindrical portion 106 are best illustrated in FIG. 6. Diaphragm return spring 32 is constrained at its upper end by contact with the underside of a diaphragm support cup 62. An upper surface of diaphragm support cup 62 facingly contacts a lower surface of diaphragm 24. Diaphragm support cup 62 includes a horizontal planar portion 108 and an annular portion 110 extending downwardly from portion 108. Annular portion 110 separates diaphragm return spring 32 from inlet check valve bias spring 102, as illustrated in FIG. 3.

As illustrated in FIG. 3, the injection molded diaphragm pump with liquid color for quick release preferably further includes a slide potentiometer designated generally 36, with the potentiometer having a T-bar 40 for detecting the position of diaphragm position sensing pin 42. A light spring 38 provides bias for diaphragm position sensing pin 42, assuring that diaphragm position sensing pin 42 remains in light contact with diaphragm 24. A pumped liquid color outlet is designated 46, while the bottom interior surface of lid 16 is designated 48 and the top exterior surface of lid 16 is designated 50 in FIG. 3. O-rings 52 seal the quick disconnect inlet section 22 and the quick disconnect liquid color outlet assembly 23 of pump 14 relative to drum lid 16.

Still referring principally to FIG. 3, pump assembly 10 further includes a liquid color outlet shutoff valve designated generally 54, a liquid color outlet shutoff valve ball designated 56 and a liquid color outlet shutoff valve spring designated 58. A diaphragm support cup is designated 62 and a sandwich-like quick disconnect plate assembly is provided as 63, which includes a quick disconnect retainer plate 65, a quick disconnect spacer plate 66, and a quick disconnect base plate 67 as illustrated in detail in FIGS. 14 though 17. An optional gasket 600 may be interposed between upper surface 50 of drum lid 16 and a lower, unnumbered surface of quick disconnect base plate 67, which faces drum lid 16.

Figure 7:
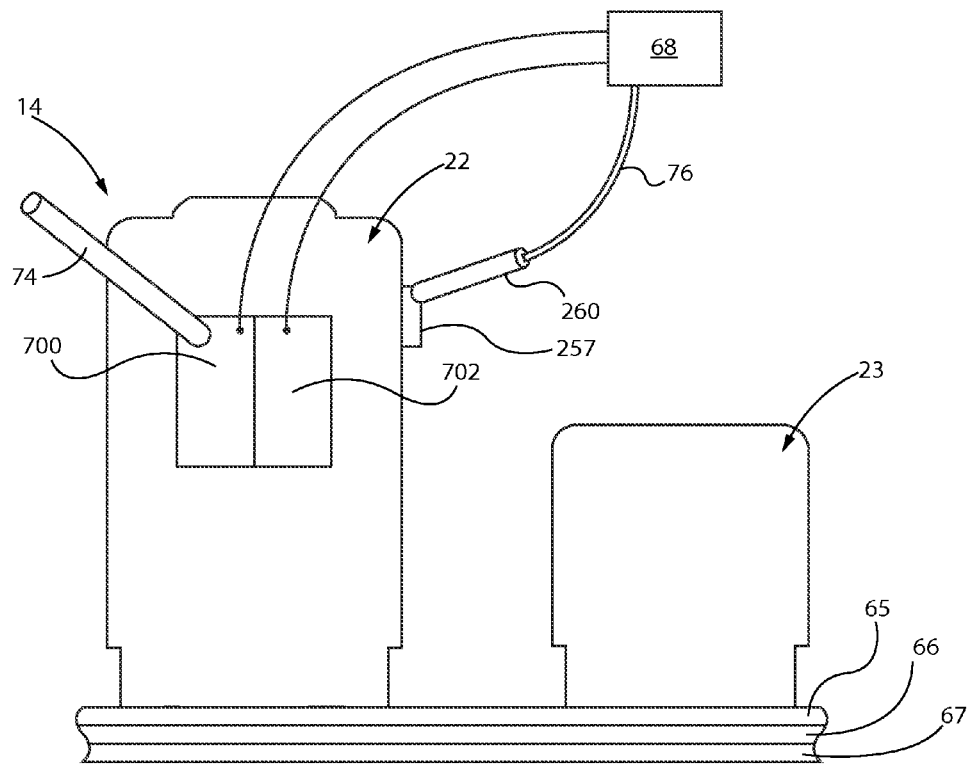
FIG. 7 is a schematic view of the injection molded diaphragm pump for liquid color with quick release as illustrated in the foregoing Figures, with a microprocessor and solenoid valves for controlling the pump shown schematically illustrated in FIG. 5.

Referring additionally to FIG. 7, a microprocessor 68 actuates and operates solenoid valves 700, 702, which supply air as needed to the upper side of diaphragm 64 from a house air line 74. A recess 84, shown in FIG. 6 as well as in FIG. 3, formed in the upper surface of pump molded one-piece lower body portion 20 defines a channel 86 for flow of liquid color from a pumping section of the pump, defined generally by the structure underlying quick disconnect inlet section 22, to an outlet section of the pump defined generally by the structure underlying quick disconnect liquid color outlet assembly 23.

An actuator designated generally 43 has specific applicably to liquid color diaphragm pumps; the actuator may also be used with piston-type pumps. In the disclosed pump to which actuator 43 is best adapted for use, air is applied to the top side of diaphragm 24, to press diaphragm 24 down. This downward movement of diaphragm 24 defines a "pumping stoke". In pump 14, spring 32 acting against support cup 62 contacting the bottom side of diaphragm 24 acts against diaphragm 24 to move diaphragm 24 up. Upward movement of diaphragm 24 in response to the force of spring 32 defines the "suction stroke".

During operation, normally diaphragm 24 is operated in full strokes, moving through the full range of motion for which diaphragm 24 is designed in pump 14. Moving diaphragm 24 downward through the full range of motion is preferably accomplished by opening a solenoid 700 and applying air pressure to move diaphragm 24 preferably all the way to the bottom of its range of motion, which may be to a position at which the bottom surface of diaphragm support cup 62 contacts inlet check valve ball 30.

When liquid color is used to color plastic parts during fabrication, careful metering of liquid color consumption is required as the liquid color is added while the plastic resin is melted and processed by a process machine. The rate the liquid color is dispensed by pump 14 must exactly match the rate at which the liquid color is consumed by the process machine.

The rate or speed of the liquid color pumping process must be precisely controlled. In some applications only require partial pump strokes are required. The rate at which liquid color is supplied by pump 14 is controlled by carefully pulsing only very small bursts of air into pump 14, into the space above diaphragm 24, where an unnumbered portion of drum lid 16 has been removed during fabrication to create an open space shown in FIGS. 2 and 3. Regulating the duration of each air pulse and regulating the time between pulses results in metering liquid color to a process machine at exactly the desired flow rate so that the process machine receives precisely the amount of liquid color the process requires, at exactly the right rate of supply of liquid color.

Critical to the success of this process for supplying liquid color is having continuous feedback of the exact position of diaphragm 24 at all times as compressed air released by solenoid valve 700 pushes diaphragm 24 downward. Knowing the exact position of diaphragm 24 at all times allows accurate continuous monitoring and correction of the liquid color flow rate by regulation of solenoid valve 700 by a slide potentiometer 36 contained within actuator 43 and microprocessor 68, and also allows accurate metering of partial stokes of diaphragm 24.

Actuator 43 accomplishes this by providing a diaphragm position sensing pin 42 that lightly rides the upper surface 24U of diaphragm 24, following diaphragm 24 as diaphragm 24 moves down and up. Actuator 43 further includes involves positioning a slide potentiometer 36, which is most desirably a linear slide potentiometer, so that slide potentiometer 36 is actuated by movement of pin 42. In one preferred embodiment, total diaphragm movement may be about 0.25 inch. A potentiometer T-bar 40 and pin 42 may move about 0.75 inch or more, but in the preferred embodiment, the pump typically uses only 0.25 inch of the stroke.

Microprocessor 68 records the upper and lower extreme positions of the linear potentiometer T-bar 40, corresponding to the upper and lower limits of diaphragm 24 travel. Microprocessor 68 then uses the readings of the potentiometer T-bar 40 that are between corresponding upper and lower limits of diaphragm travel to determine the exact location of diaphragm 24 as the diaphragm 24 moves up and down and pumps liquid color. The 0.25 inch of stroke of diaphragm 24 translates into about 300 different position readings of the pin 42 and potentiometer T-bar 40, which may be stored and used by microprocessor 68, assuring precise readout of diaphragm location at any time. Microprocessor 68 controls solenoid valves 700,702 and pulses those valves, particularly solenoid valve 700, to provide repeated pulses of compressed air to the interior 274 of actuator 43. Air in the form of these pulses moves downwardly along diaphragm position sensing pin 42, within the sealed interior of actuator 43, and passes around the bottom of diaphragm position sensing pin 42 into the open space formed in drum lid 16 to contact and provide air pressure creating force against upper surface 24U of diaphragm 24. This is best visualized considering FIG. 3. Downward force resulting from the pressurized air pulses pressing against surface 24U pushes diaphragm 24 downwardly thereby forcing liquid color in open interior 98 of one piece lower body portion 20 to move out of open interior 98 in the direction indicated by the arrow in channel 86 in FIG. 3, from there into lower portion 304 of quarter turn adapter outlet assembly 25, upwardly through inner tubular passageway 278 therein, on through quarter turn adapter 25, and out as indicated by "out" arrow in FIG. 13.

Pin 42 provides physical connection of potentiometer 36 with the top side of diaphragm 24, to sense the movement of diaphragm 24. Using a moving pin passing through an air pressure seal would risk leaking air around the seal and would compromise metering accuracy.

The invention has no parts moving through a seal. Potentiometer 36 and pin 42 reside within the actuator interior 274 that is pressurized.

Figure 8:
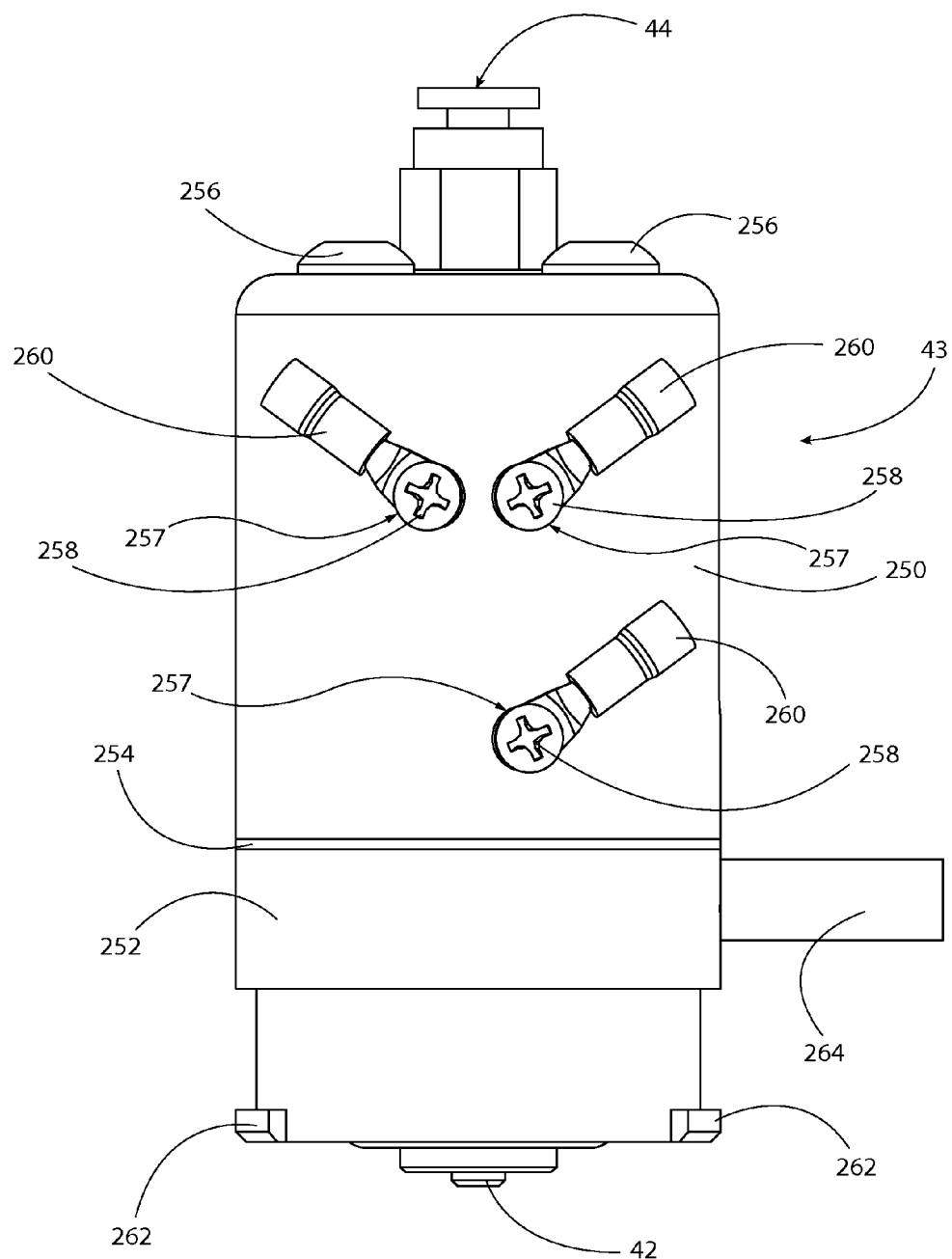
FIG. 8 is a front elevation of the actuator portion of the injection molded diaphragm pump for liquid color with quick release illustrated in the foregoing Figures.
Figure 9:
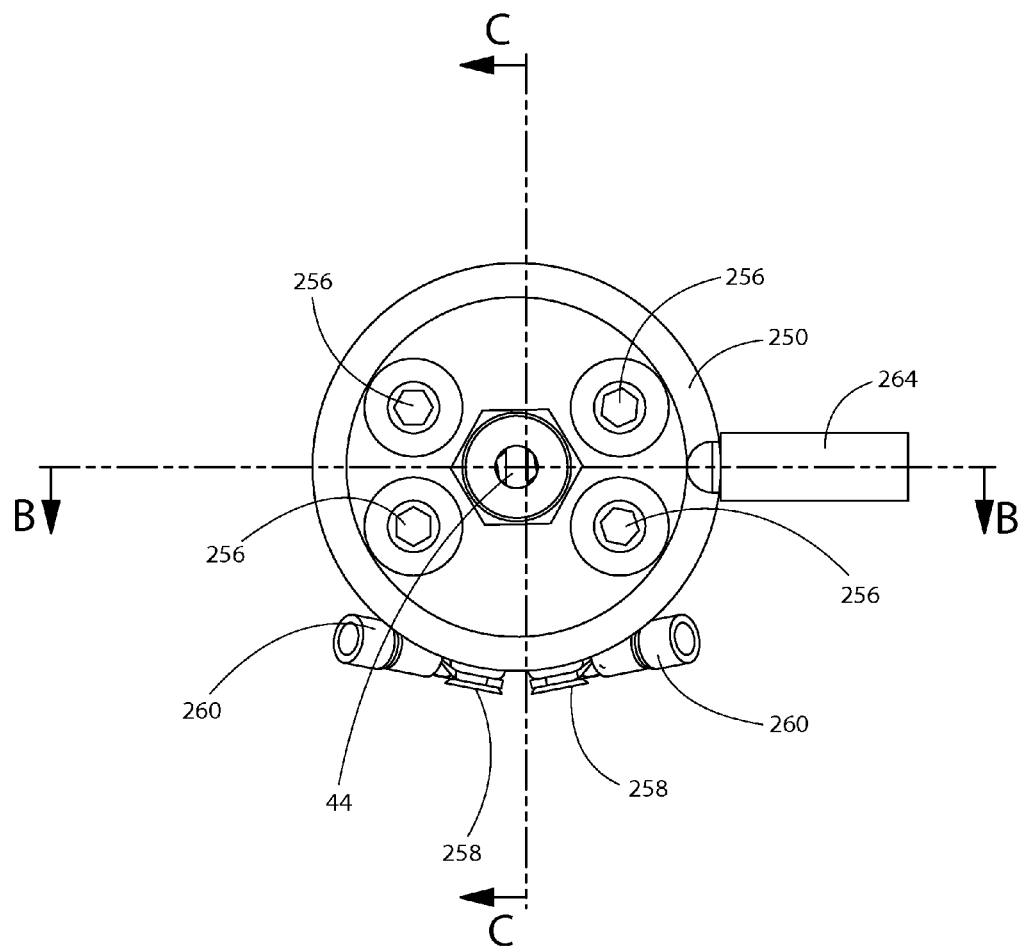
FIG. 9 is a top view of the actuator portion of the injection molded diaphragm pump for liquid color with quick release illustrated in FIG. 8.

Referring to FIGS. 7 and 8, electrical signals from potentiometer 36 are brought out of the pressurized interior 274 of actuator 43 through screws 257 connecting with potentiometer electrical leads 268 within the pressurized interior 274 of actuator 43; the screws 257 are sealed against air leakage where they enter the pressurized interior 274 of actuator 43. Actuator 43 is preferably fabricated of closed cell foam. When screws 257 are driven into the closed cell foam of actuator 43, the screws self-seal themselves in the foam. Absence of any moving or sliding seals assures correct operation for many years with no wear points to fail.

Still referring principally to FIG. 3, a light spring 38, above sliding "T-bar" portion 40 of slide potentiometer 36 and bearing on sliding T-bar 40, which in turn bears on pin 42, assures that pin 42 follows diaphragm 24 down as the air pushes diaphragm 24 down. Diaphragm return spring 32 acting against diaphragm support cup 62, which in turn contacts lower side 24L of diaphragm 24 pushes diaphragm 24 up at the end of a pump stoke, and diaphragm 24 then pushes pin 42 and potentiometer sliding T-bar portion 40 up against the bias of light spring 38.

Actuator 43 is removable from pump 14. Preferably a one-quarter turn locking system with an O-ring base seal described hereinbelow, allows actuator 43 to be installed or removed easily.

Referring to FIGS. 3 and 7, actuator 43 is generally cylindrical in form, with a house air inlet in the rear thereof being fed by a house air supply line 74, which supplies air indirectly with the air being controlled by solenoid valves 700, 702 operating off of house air line 74. Microprocessor 68 receives signals from slide potentiometer 36 resident within actuator 43.

Diaphragm 24 of pump 14 does the actual pumping. Spring 38, slide potentiometer 36 and actuator pin 42 work with microprocessor 68 to monitor the position of diaphragm 24 in the pumping chamber interior of actuator 43 as diaphragm 24 moves in response to air pressure, most desirably bursts of air pressure, applied to the top side of the diaphragm as air passes downwardly around the edges of diaphragm position sensing pin 42, as the air is released by rapid intermittent operation of solenoid valves 700, 702 when triggered by microprocessor 68. With the rapid repeated blasts of air released by operation of solenoid valves 700,702, the air maintains a pressurized condition within actuator interior 274.

Actuator 43 has an upper portion 250 and a lower portion 252 connected and held together by hold down bolts 256 shown in FIG. 8. An actuator internal gasket 254 resides between actuator upper portion 250 and actuator lower portion 252.

Actuator upper portion 250, within which actuator interior 274 is located, is preferably insulative, air tight polymer foam.

Actuator 43 further includes actuator signal connection external terminals designated 258 in the drawings, which are preferably the heads of Phillips head screws 257 and which have associated therewith tubular connection covers 260, so that suitable wire connections can be made to actuator signal connection external terminals 258, with the wire connections desirably passing through tubular connection covers 260.

Actuator 43 further includes a pair of lugs 262 illustrated in both FIGS. 3 and 8, but numbered only in FIG. 8, which form the male potion of a preferable quarter turn quick disconnect assembly which allows actuator 43 to be quickly removed from liquid color pump 14 and replaced if need be. A handle 264, illustrated in FIG. 8, is provided as part of actuator 43 to assist in manual, preferably quarter turn, rotational movement of actuator 43 to remove it from liquid color pump 14.

Actuating air for diaphragm 24, as supplied by the operation of solenoid valves 700, 702, enters actuator interior 274 via passageways through actuator upper portion 250. Since solenoid valves 700, 702 are mounted in flush connection with actuator upper portion 250 as illustrated in FIG. 7, there is no leakage to ambient of the pulsed air supplied by solenoid valves 700, 702; all of the pulsed air is provided directly to actuator interior 274. The passageway via which the pulsed air is provided by solenoid valves 700, 702 to actuator interior 274 is not depicted in the drawings.

Figure 11:
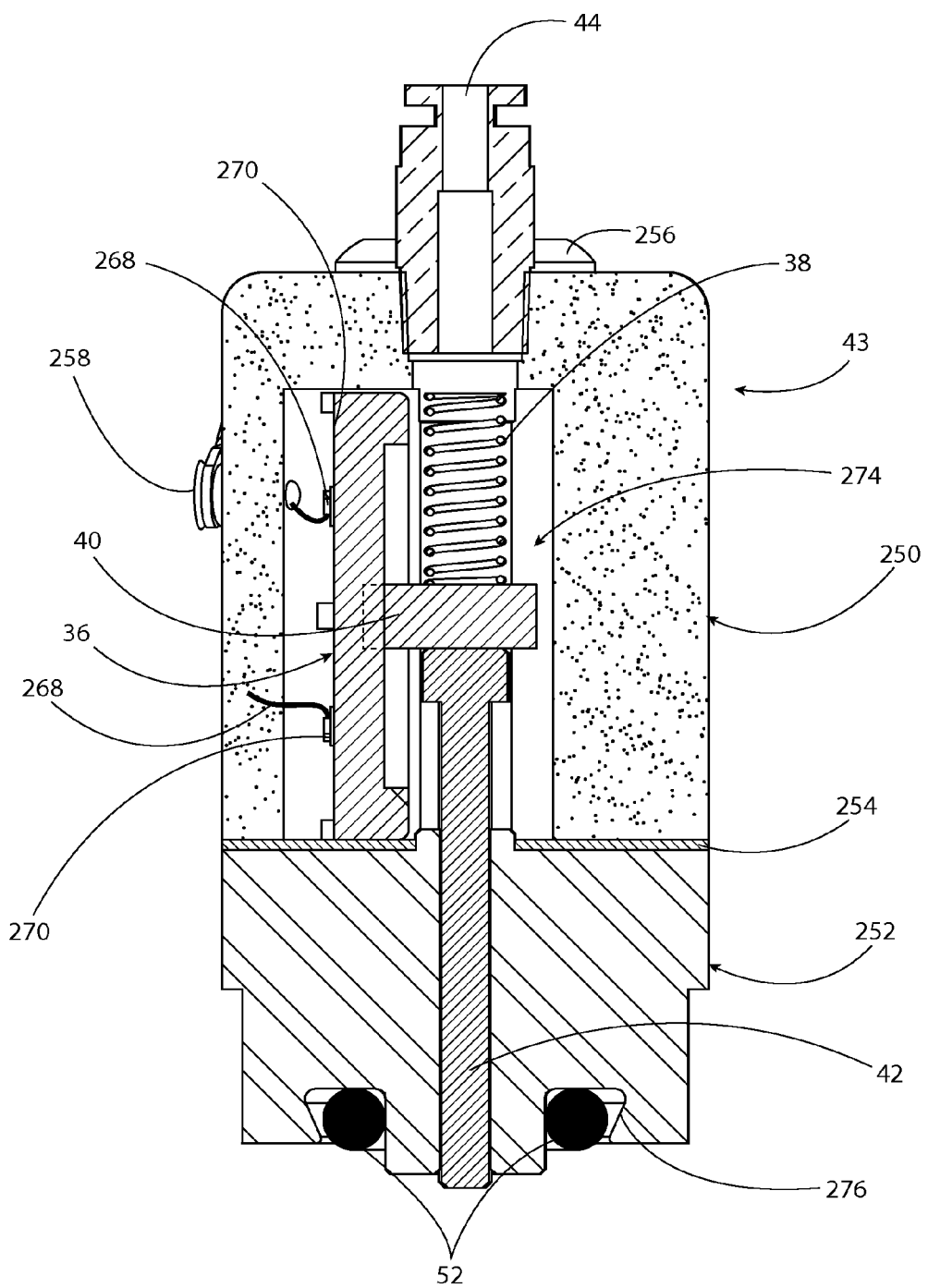
FIG. 11 is a sectional view of the actuator portion of the injection molded diaphragm pump for liquid color with quick release taken at lines and arrows C-C in FIG. 9.

Electrical leads from slide potentiometer 36 that are internal to actuator 43 are designated generally 268. These leads connect to potentiometer electrical terminals 270 that are shown in FIG. 11. Actuator interior 274 is present within upper portion 250 of actuator 43 with slide potentiometer 36, pin biasing spring 38, and the upper portion of actuator pin 42 all being resident therewithin, as illustrated in FIG. 3. Upon microprocessor 68 actuating solenoid valves 700, 702 to provide pulses of air to diaphragm 24, the air passes downwardly through actuator interior 274, around and along pin 42 and the surrounding lower portion 252 of actuator 43 to escape at the bottom of pin 42 into the space on the upper side of pumping diaphragm 24 of diaphragm pump 14.

O-rings 52 are provided so that in combination with the quarter turn release mechanism of which lugs 262 form a part, the actuator upon a quarter turn thereof is in tight facing connection with the quick disconnect base plate 67 of pump 14 such that an air tight seal is created between the lower planar surface 276 of actuator lower portion 252 and quick disconnect base plate 67, which in turn has an air tight seal between base plate 67 and the upper exterior surface 50 of lid 16 due to the presence of gasket 600 and nut-bolt combinations 88 that retain the sandwiched three plate quick disconnect assembly 63 in place against gasket 600. Once the air applied to diaphragm 24 has pushed diaphragm 24 downwardly, thereby forcing liquid color below the diaphragm out through the outlet channel 86 as pump diaphragm return spring 32 pushes diaphragm 24 upwardly, back into the neutral position, whereupon more pulses of air, signaled by microprocessor 68 and released by action of the solenoid valves 700, 702, passes downwardly through actuator interior 274 as described above and applies force in the form of air pressure to the upper side 24U of pumping diaphragm 24.

Actuator interior 274 is sealed such that air cannot enter actuator interior 274 other than through the action of microprocessor actuating the solenoid valve and providing air in pulses via air inlet 44. All electrical connections to potentiometer 36 are provided by potentiometer electrical leads 268, typical ones of which have been illustrated in the drawings. These potentiometer electrical leads pass through the polymer foam body of actuator upper portion 250 and are sealed within that polymer foam body so that no air can enter into actuator interior 274 other than the air provided by solenoid valve 700.

While actuator 43 has been illustrated in generally cylindrical form, the actuator may be in any other form such as with a triangular horizontal cross-section, a rectangular horizontal cross-section, a hexagonal horizontal cross-section, and an octagonal horizontal cross-section, etc.

Gasket 254 provides a tight seal between the upper portion 250 and lower portion 252 of actuator 43. The presence of air pressure within actuator interior 274 assures that air will not flow into actuator interior 274 other than through the passageway for solenoid valves 700, 702 as air provided by solenoid valves 700, 702 is on its way to the top surface 24U of the pumping diaphragm 24.

Referring to the drawings, in the pump of the invention air (or another pumping fluid) under pressure is applied to an upper side 24U of a diaphragm 24, to press diaphragm 24 downwards. This downward movement of diaphragm 24 defines the "pumping stoke". In the pump, a diaphragm return spring 32 acts to urge diaphragm 24 up. Upward movement of diaphragm 24 in response to the force of diaphragm return spring 32 defines the "suction stroke".

Moving the diaphragm downward through part of all of the full range of motion is preferably accomplished by operation of solenoid actuated air valves 700, 702 and applying air pressure, as described in more detail below, to move the diaphragm optionally all the way to the bottom of its range of motion, which may be to the bottom of a pumping cavity formed in the open interior 98 of one piece lower body portion 20, or to move the diaphragm through less than its full range of motion.

Figure 18:
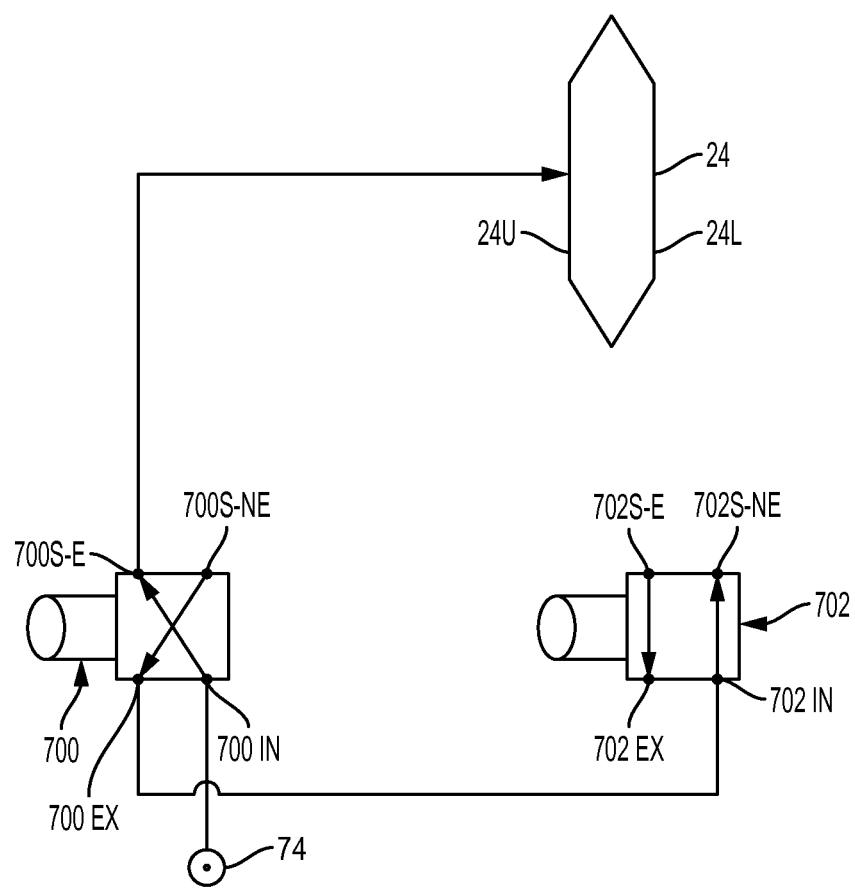
FIG. 18 is a schematic view of two solenoid valves connected together to provide pressurized air to one side of a pumping diaphragm of an injection molded diaphragm pump for liquid color with quick release in accordance with the invention.
Figure 19:
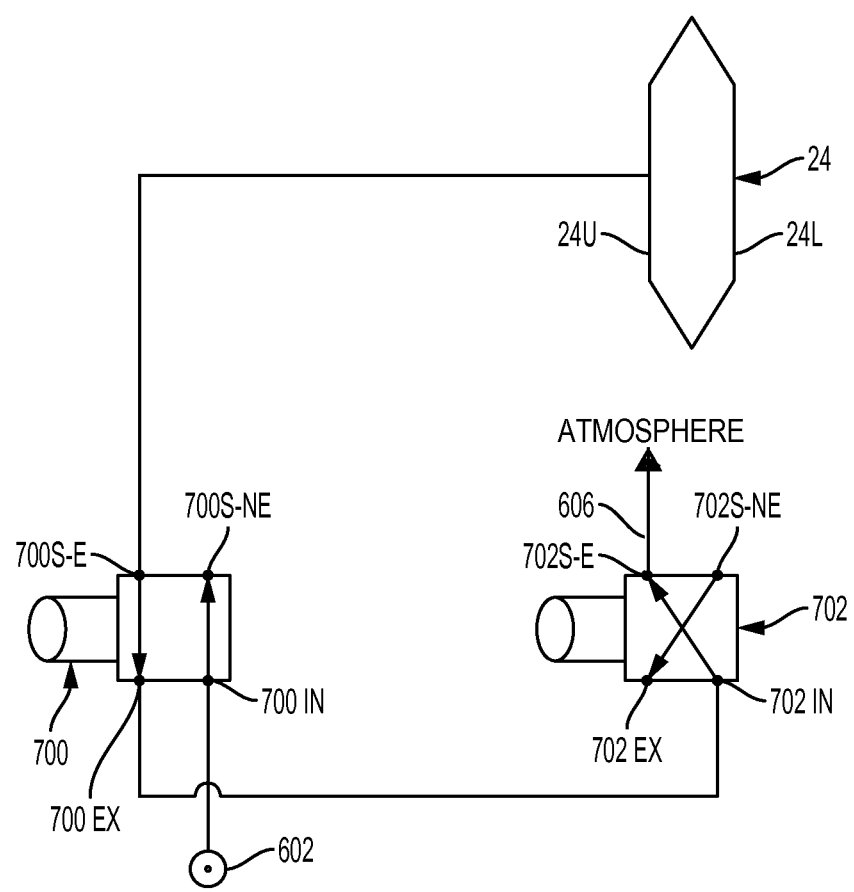
FIG. 19 is a schematic view of the same two solenoid valves illustrated in FIG. 18, with the valves energized in a manner to vent the side of the diaphragm to which compressed air had been supplied to effectuate liquid color pumping in FIG. 18.

Referring to FIGS. 7, 18 and 19, solenoid valves 700, 702 provide pressurized air to diaphragm 24, specifically to the upper surface 24U of diaphragm 24 illustrated in FIG. 3 and is the surface of diaphragm 24 that is contacted by pin 42 as pin 42 rides diaphragm 24 to provide positional data respecting the position of diaphragm 24 via signals generated by slide potentiometer 36 as "T-bar" 40 moves with diaphragm position sensing pin 42.

Solenoid valves 700, 702 are mounted on the rear of actuator 43 forming a portion of liquid color pump inlet section 22, as illustrated in FIG. 7. Solenoid valves 700, 702 are controlled by microprocessor 68 and are connected thereto desirably by electric lines 603, 604. Of course, wireless connection is also feasible and desirable in connection with the practice of this invention.

Compressed air is supplied to first solenoid valve 700 by a house air line 74 as illustrated in FIG. 7.

Microprocessor 68 actuates and operates solenoid valves 700, 702, which supply air as needed to the upper side of diaphragm 24 from a house air line 74, as illustrated in FIG. 7. A signal carried by an outlet signal line 76 from potentiometer 36 allows microprocessor 68 to effectuate effective control of valves 700, 702.

Referring to the schematic drawings presented as FIGS. 18 and 19 showing the operation of first and second solenoid valves 700, 702, each of the first and second solenoid valves 700, 702 have an inlet port, an exhaust port, a valve energized supply port, and a valve non-energized supply port. The inlet port, exhaust port, valve energized supply port, and valve non-energized supply port are respectively indicated by "IN" for "inlet port", "EX" for "exhaust port", "S-E" for "valve energized supply port" and "S-NE" for "valve non-energized supply port." Each of first and second solenoid valves 700, 702 have their respective inlet ports, exhaust ports, valve energized supply ports and valve non-energized supply ports indicated by the corresponding appropriate alphabetic combinations in FIGS. 18 and 19.

As shown in FIG. 18, when compressed air (or some other pumping fluid) is to be provided in pulses to the upper side of diaphragm 24, with upper side of diaphragm 24 denoted 24U and depicted schematically in FIG. 18, air from house air line 74 is supplied to inlet port 700IN of first solenoid valve 700. Upon energization of first solenoid valve 700, inlet port 700IN is connected to valve energized supply port 700S-E, which connects to the open interior 274 of actuator 43 defining a major portion of pump inlet section 22 and a pulse of compressed air is resultingly applied to upper side 24U of diaphragm 24.

As soon as the required pulse has been applied for the required duration, as determined by microprocessor 68 monitoring displacement of diaphragm 24 as sensed by slide potentiometer 36, valve 700 is de-energized by microprocessor 68. However, upon de-energization of valve 700 the compressed air applied to the diaphragm upper surface 24U remains present and cannot escape, since the inlet port 700IN of first solenoid valve 700 is connected to exhaust port 700EX, and exhaust port 700EX is in turn connected to the inlet port 702IN of solenoid valve 702. Since solenoid valve 702 is not energized, air entering inlet port 702IN of solenoid valve 702 attempts to go to valve non-energized supply port 702S-NE.

However, in the implementation of the invention illustrated in FIGS. 18 and 19, the non-energized supply port 702S-NE of valve 702 is permanently blocked. Hence, as first solenoid valve 700 is cycled on and off, with each "on" cycle of first solenoid valve 700 air pressure builds against the upper side 24U of diaphragm 24, thereby further displacing diaphragm 24 downwardly in FIG. 3 and effectively pumping liquid color present in open interior 98 of lower body portion 20 in FIGS. 3 and 6 out of open interior 98, with the liquid color moving to the left in FIGS. 3 and 6 through channel 84 as indicated by the arrow in channel 86 in FIG. 3 and upwardly through pump outlet section 23 defined generally by a quarter turn adapter outlet fitting, as illustrated in FIG. 3.

As first solenoid valve 700 continues to cycle on and off and continues thereby to force additional bursts of air pressure against upper side 24U of diaphragm 24, diaphragm 24 continues to deflect downwardly considering FIG. 3, thereby forcing additional liquid color out of open interior 98 of lower body portion 20 through channel 84 and out of pump 14.

Once the slide potentiometer 36 indicates that the diaphragm 24 has reached its maximum displacement and microprocessor 68 determines that diaphragm 24 has pumped the maximum or a desired amount of liquid color at a desired rate, first solenoid valve 700 is de-energized by microprocessor 68 and second solenoid valve 702 is energized by microprocessor 68. This opens a passageway for escape of the air that had been pressing against upper surface 24U of diaphragm 24 with that air flowing out of de-energized first solenoid valve 700 by passing through port 700S-E and then port 700EX and on to now energized second solenoid valve 702 entering valve 702 through inlet port 702IN and then venting to atmosphere through solenoid valve 702 by exiting that valve via energized supply port 702S-E, as depicted schematically in FIG. 19.

While operation and the structure of the invention as disclosed has shown first and second solenoid valves 700, 702 as four-port valves, three-port valves could equally well be used, whereupon energization of such a three-port valve, the inlet port is connected to a single supply port, and upon de-energization of the valve, the single supply port is connected to the valve exhaust port. In the drawings a source of house air is schematically shown and designated 602.

Three-port and four-port solenoid valves suitable for use in practice of the invention are available from MAC Valves located at 30569 Beck Road, Wixom, Mich.

Use of the four-port solenoid valve in the preferred practice of the invention facilitates the delivery of air in extremely small amounts to provide fine, very precise control of diaphragm 24. First solenoid valve 700 is turned on and off for very short "on" times, such as ten milliseconds, namely $1/100^{th}$ of a second. One such "on" time provides a very short pulse of air against upper side 24U of diaphragm 24. When first solenoid valve 700 is turned off, the air just delivered against upper side 24U of diaphragm 24 would normally escape by flowing back through the solenoid valve and exiting exhaust port 700EX, if only a single solenoid valve was provided. However, this is not the way the invention in its preferable mode works, as the invention does not want this air to be exhausted until diaphragm 24 has completed its full pumping displacement as controlled by the microprocessor for the particular liquid color being supplied and the particular process machine being serviced thereby. Accordingly, a second solenoid valve, solenoid valve 702, is connected to the exhaust port of first solenoid valve 700 and is used to keep exhaust port 700EX closed until venting is required.

When microprocessor 68 determines it is time to relieve the pressure on diaphragm 24 to allow diaphragm 24 to return to its neutral position and hence to allow additional liquid color to flow upwardly into open interior 98 of lower body portion 20 that has just been pumped free of liquid color, air must be exhausted from the upper side 24U of diaphragm 24, so second solenoid valve 702 is energized and the air is vented to atmosphere as indicted by arrow 606 in FIG. 19. Presence of second solenoid valve 702 maintaining air pressure in the system, as air pressure is incrementally increased on diaphragm surface 24U by the on and off action of first solenoid valve 700 facilitates ultrafine control of feeding of liquid color.

In the four port solenoid valve implementation of the invention ports 700S-NE and 702S-NE preferably are permanently sealed.

Figure 14:
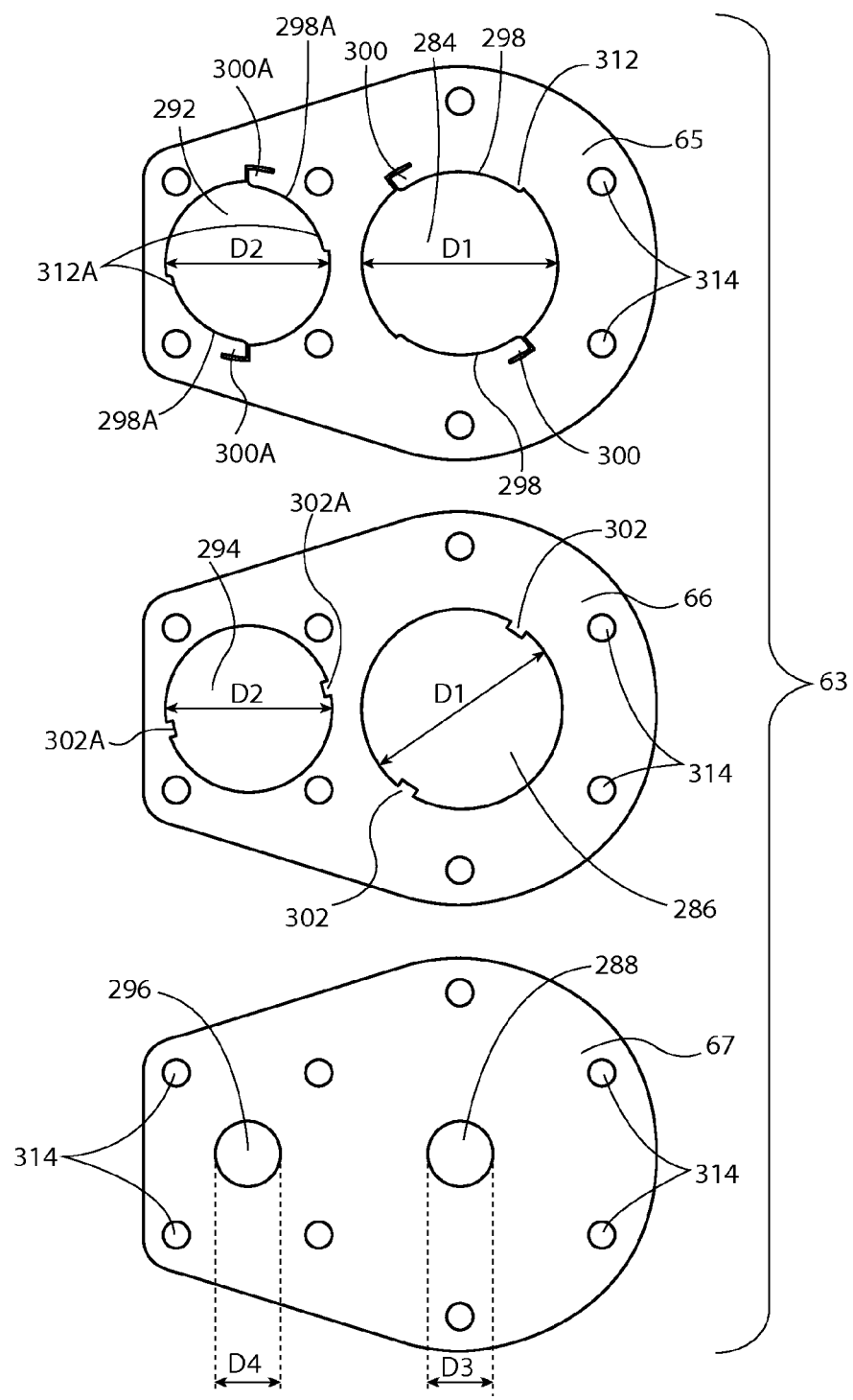
FIG. 14 is a plan view of components of a sandwich-type quick disconnect plate assembly portion of an injection molded diaphragm pump for liquid color with quick release showing, from top to bottom, a quick disconnect retainer plate, a quick disconnect spacer plate, and a quick disconnect base plate.
Figure 15:
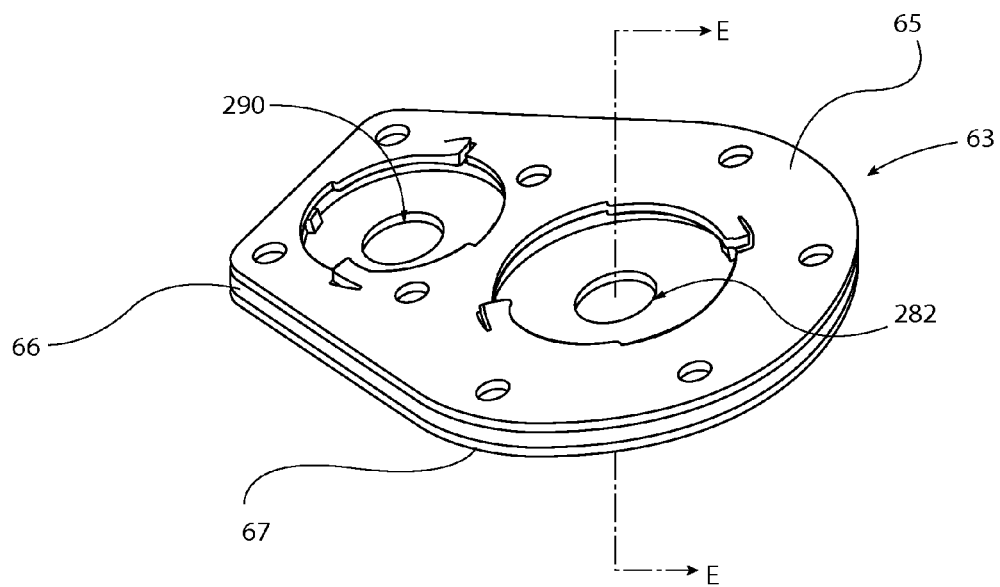
FIG. 15 is an isometric view of the assembled quick disconnect plate sandwich assembly portion of the injection molded diaphragm pump for liquid color with quick release, the plates of sandwich being illustrated in FIG. 14.
Figure 16:
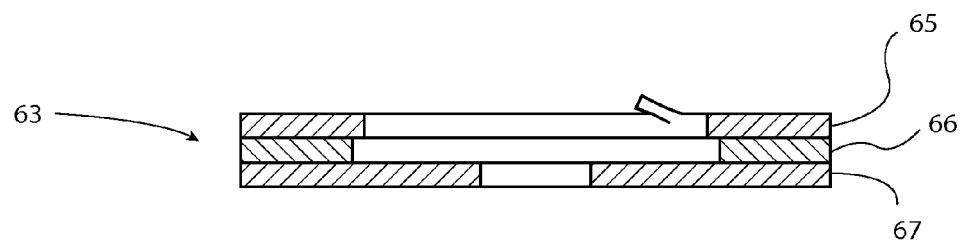
FIG. 16 is a sectional view of the assembled quick disconnect plate sandwich assembly portion of an injection molded diaphragm pump for liquid color with quick release taken at lines and arrows E-E in FIG. 15.
Figure 17:
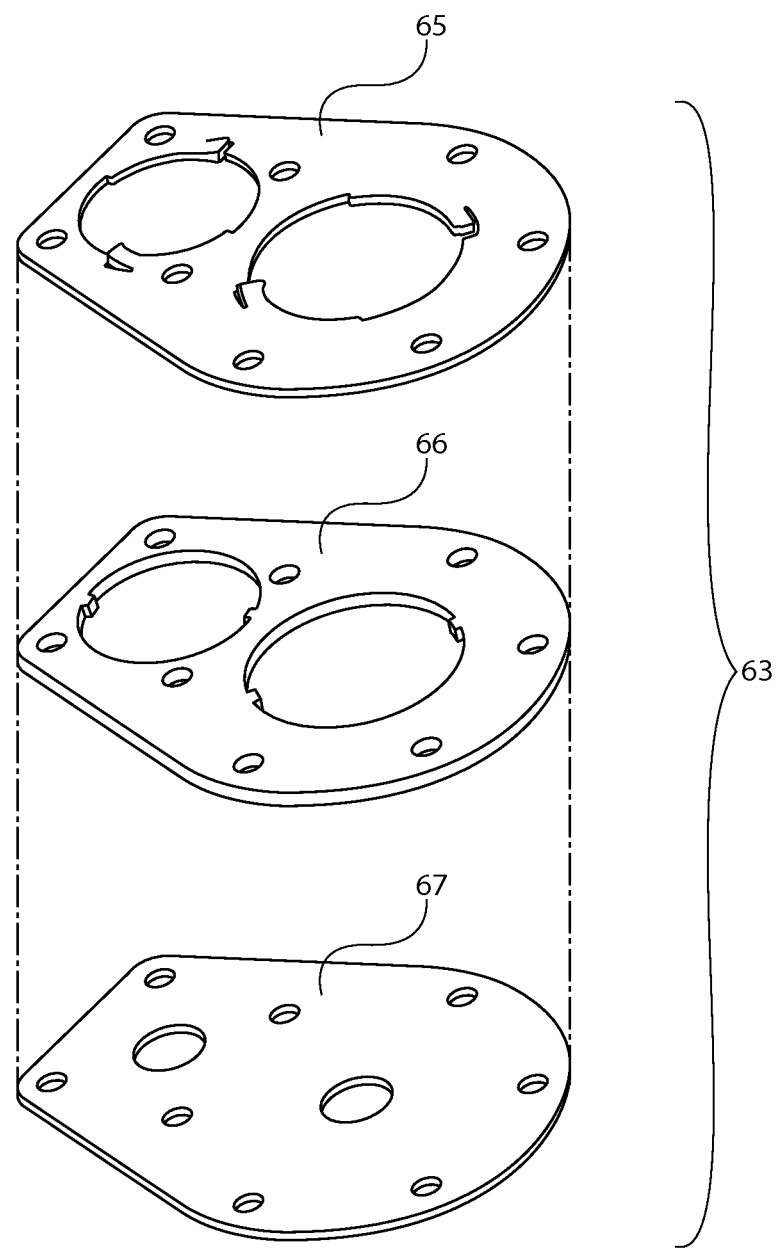
FIG. 17 is an exploded isometric schematic view of sandwich-type quick disconnect plate assembly portion of an injection molded diaphragm pump for liquid color with quick release as illustrated in FIGS. 14 through 16 showing, from top to bottom, the quick disconnect retainer plate, the quick disconnect spacer plate, and the quick disconnect base plate.

With reference to FIGS. 3, and 14 through 17, a multiple plate quick disconnect sandwich 63 includes a retainer plate 65, a spacer plate 66, and a base plate 67. Each of plates 65, 66, 67 desirably include generally annular openings that correspond to generally cylindrical connections of pump inlet section 22 and pump outlet section 23 or to conduits that are to be connected together and/or to pumps, to process machines, and the like. As depicted in FIGS. 14, 15 and 17, the retainer plate 65 includes a larger arcuate passageway 284 and a smaller arcuate passageway 292; the spacer plate 66 includes a larger arcuate passageway 286 and a smaller arcuate passageway 294; and the base plate 67 includes a larger arcuate passageway 288 and a smaller arcuate passageway 296. As shown in FIGS. 15 and 16, the respective plates are desirably placed on one another to create the multiple plate quick disconnect sandwich 63. In this configuration, the respective associated larger and associated smaller passageways in each plate 65, 66, 67 form what may be either an inlet or an outlet larger arcuate passageway 282 and what may be either an inlet or outlet smaller arcuate passageway 290. The arcuate larger passageways 284, 286 of retainer plate 65 and spacer plate 66 are preferably formed on the same radius such that they have the same diameter D1 and their respective smaller arcuate passageways 292, 294 are similarly formed on a smaller common radius and have the same diameter D2, with D1 being larger than D2.

Larger arcuate passageway 288 and smaller arcuate passageway 296 of base plate 67 are each preferably formed with smaller radii than that of associated larger arcuate passageways 284, 286 and associated smaller outlet passageways 292, 294 of retainer plate 65 and spacer plate 66, and have diameters D3 and D4, respectively.

Figure 10:
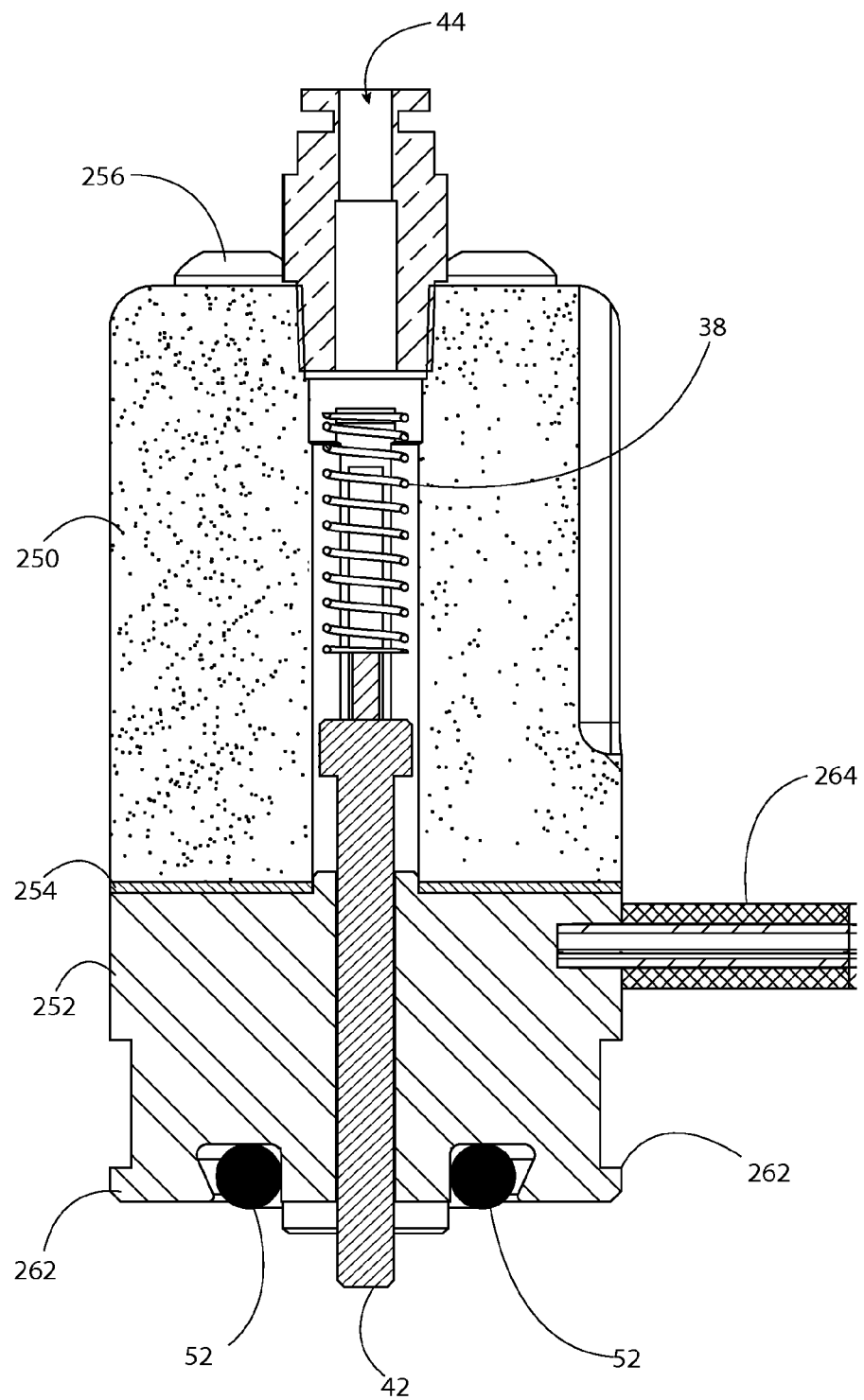
FIG. 10 is a sectional view of the actuator portion of the injection molded diaphragm pump for liquid color with quick release taken at lines and arrows B-B in FIG. 9.

Diameters D1, D2, D3, and D4 are preferably determined by the dimensions of the inlets and outlets being connected. Diameter D1 is preferably substantially equivalent to the cross-sectional width of an associated assembly to be connected, namely pump inlet section 22, from the outer edge of one lug to the outer edge of an opposing lug, such as lugs 262 in FIG. 10. Similarly, diameter D2 is preferably substantially equivalent to the cross-sectional width of an associated assembly from the outer edge of one lug to the outer edge of an opposing lug, such as lugs 262B in FIGS. 12 and 13. Diameter D3 and diameter D4 are chosen according to the sizes of the conduit inlet and outlet being connected using the multiple plate quick disconnect sandwich assembly 63.

Still referring to FIGS. 14 through 17, retainer plate 65 preferably includes pairs of arcuate retaining guides 298, 298A with the guides extending slightly into retainer plate arcuate passageway 284 and the retainer plate arcuate passageway 292 on opposite sides thereof to form regions of reduced diameter in arcuate passageway 282 and in arcuate passageway 290. Retaining guides 298, 298A preferably each have an arc length of 80°. As noted above in alternative embodiments, the arc length of retaining guides 298, 298A may range from about 30° to about 150°.

Each retaining guide 298, 298A extends from an associated sloped leading tab 300 to a trailing edge 312, 312A, with tab 300 and edge 312 defining the angular extremities of arcuate retaining guides 298, 298A. Each sloped leading tab 300 is preferably angled upwardly, away from spacer plate 66, about ten degrees with respect to the planar surface of retainer plate 65, which is opposite from the surface of retaining plate 65 that facingly contacts spacer plate 66.

Spacer plate 66 includes preferably generally rectangular stops 302, 302A extending generally radially inwardly from the inner periphery of arcuate passageways 286, 294 of spacer plate 66. As shown in FIG. 15, when plates 65, 66, 67 are placed on top of each other to form the quick disconnect sandwich 63, stops 302, 302A are preferably both axially and angularly aligned with trailing edges 312,312A of retainer plate 65.

Each plate 65, 66, 67 of multiple plat quick disconnect sandwich assembly 63 includes openings 314 that align with the with openings in a structure or container or mechanism to allow for mounting multiple plate quick disconnect sandwich assembly 63 to a structure or container or mechanism or a conduit for which rapid connection/disconnection with another structure or container or mechanism or conduit is desired. Nut and bolt combinations are preferably used for such mounts.

After quick disconnect sandwich 63 is assembled as shown in FIGS. 15 and 16, and is attached to a structure or container or mechanism or conduit, the structure to be quickly connected/disconnected may be centered over an arcuate passageway 282 or 290 of multiple plate quick disconnect sandwich assembly 63 in a position such that a lower portion, of a structure with which connection is to be effectuated, extends through arcuate passageway 296 or 288 of the quick disconnect base plate 67 and appropriately sized and positioned lugs are adjacent the sloped leadings tabs 300 or 300A of the retaining guides 298 or 298A while lower planar surfaces of the lugs rest on the upper surface of retainer plate 65. As the apparatus to be connected is rotated, the lug portions of the apparatus slide under sloped leading tabs 300 or 300A and then continue to moveably slide under the remainder of retaining guide 298 or 298A along the surface of base plate 67 until the lugs abut stops 302 or 302A on spacer plate 66. Due to the angular and sloped configuration of leading tabs 300 or 300A, the structure to be connected is gradually pressed against the outwardly facing surface of base plate 67 as the structure to be connected is rotated into place. The overhang formed by the retaining guides 298 prevents the lugs of the structure to be connected from being displaced in the vertical direction.

Because stops 302, 302A are preferably located nearly or directly below trailing edge 312, 312A of the retaining guide 298, 298A, the structure to be connected preferably only requires approximately a quarter turn to transition from an unlocked position, in which the lugs of the structure to be connected are located outside leading tabs 300, 300A of retaining guide 298, 298A, to a locked position, in which the lugs of the structure to be connected are adjacent stops 302, 302A. To disconnect, the structure is rotated a quarter turn in the opposite direction such that the lugs of the structure slide out from under the leading tabs 300, 300A.

Figure 12:
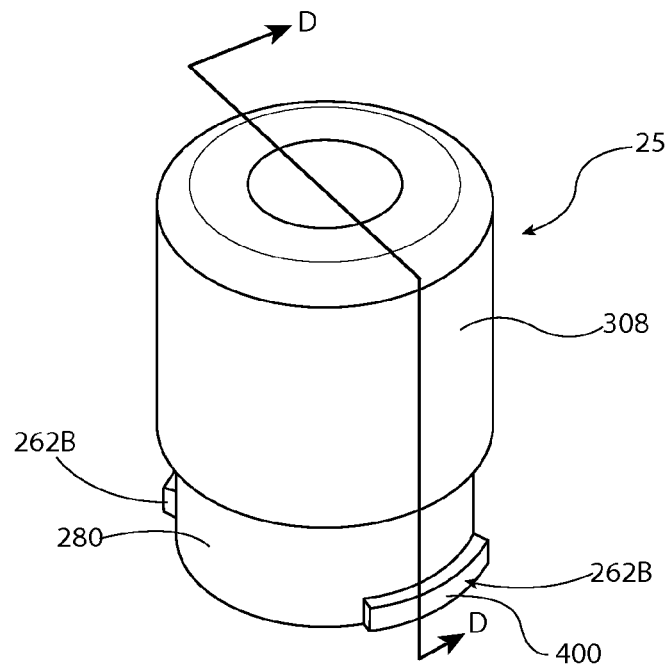
FIG. 12 is an isometric view of the quick disconnect liquid color outlet assembly portion of the injection molded diaphragm pump for liquid color with quick release illustrated in the foregoing Figures.
Figure 13:
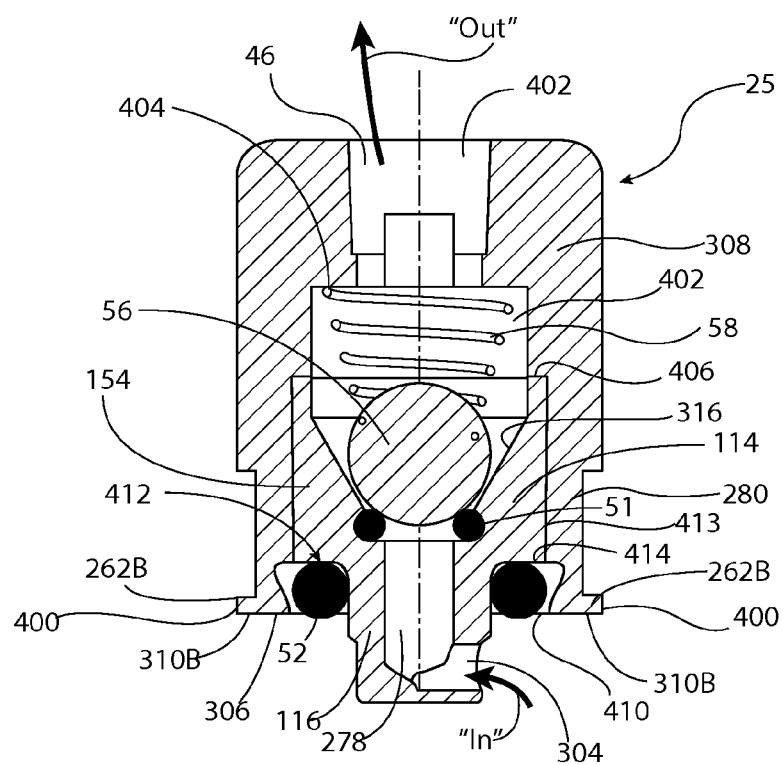
FIG. 13 is a section view of the quick disconnect liquid color outlet assembly portion of the injection molded diaphragm pump for liquid color with quick release taken at lines and arrows D-D in FIG. 12.

A pump outlet section 23, which includes a quarter turn adapter outlet assembly 25, illustrated in FIGS. 12 and 13 which is adapted to matingly connect with the multiple plate quick disconnect sandwich assembly 63 as disclosed herein. When so-connected, quarter turn adapter outlet assembly 25 connects an output from pump 14 to a delivery line or other receptacle or receiver for the liquid color coming from pump 14. One end of such a delivery line fits into an upper recess 46, which defines a liquid color conduit outlet, of quarter turn adapter outlet assembly 25. The other end of such a delivery line (the delivery line is not shown in the drawing as fitting into an upper recess 46 of quarter turn adapter 25) desirably connects to a process machine, namely either an injection molding machine or an extruder or perhaps to a gravimetric blender. Upper recess 46 may be equipped with internal threads or otherwise modified from the straight-line tubular form illustrated in FIG. 13 so as to provide connection for a delivery line to fit tightly into or with quarter turn adapter 25 to receive liquid color coming through quarter turn adapter 25 and out of upper recess 46.

A second adapter, namely pump inlet section 22, which also includes a quick-disconnect connection as described above, connects the air supply to pump 14.

The first and second adapters, namely quarter turn adapter outlet assembly 25 and pump inlet section 22, are removable from pump 14.

FIGS. 12 and 13 illustrate an embodiment of the quarter turn adapter outlet assembly 25 which includes, generally, an outer portion 308 and an inner portion 114. Outer portion 308 has pumped liquid color outlet conduit 46 defining one end of an axial passageway 402 extending through outer portion 308. Inner portion 114 includes an interior tubular passageway 278. Lugs 262B extend radially from an annular exterior recess surface 280 of outer portion 308 and have outwardly facing curved annular surfaces 400, one of which is shown in FIG. 12, and which exhibit the same curvature as annular exterior recess surface 280 of outer portion 308. Preferably, the lower surfaces 310B of lugs 262B are coplanar with a lower planar surface 306 of outer portion 308 of quarter turn adapter outlet assembly 25.

Quarter turn adapter outlet assembly 25 includes as a part of inner portion 114 a liquid color outlet shutoff valve designated generally 154, a liquid color outlet shutoff valve ball 56, a first o-ring 51 and a liquid color outlet shutoff valve spring 58. Liquid color outlet shutoff valve 154 has a seat 316, formed as an upwardly facing conical surface of inner portion 114.

Inner portion 114 is preferably press-fit into a hollow interior of outer portion 308 of the quarter turn adapter outlet assembly 25. Inner portion 114 includes a lower annular protrusion 116 extending beyond the lower planar surface 306 of outer portion 308 and below annular exterior recess surface 280 of outer portion 308 of quarter turn adapter outlet assembly 25.

Passageway 278 extends axially part way down the axial length of inner portion 114, from the surface with o-ring 51 defining a valve seat. However, passageway 278 does not exit inner portion 114 axially, but turns and extends laterally, having a lateral opening 304 formed in lower annular protrusion 116, for intake of pumped liquid color thereinto.

The connection resulting from use of quarter turn adapter outlet assembly 25 is preferably air tight. Accordingly, it is preferable that a second o-ring 52 is provided with the quarter turn adapter outlet assembly so that in combination with lugs 262B and the multiple plate quick disconnect sandwich assembly 63 described above, quarter turn adapter outlet assembly 25, upon a quarter turn, is in tight facing connection with the frame or mouth portion of an associated structure such that an air tight seal is created between the lower surface 310B of lugs 262B and the lower surface 306 of outer portion 308 of the quarter turn adapter outlet assembly 25, and the frame or mouth of the associated structure, to which the quarter turn adapter outlet assembly is to be connected.

Still referring principally to FIG. 13 and to FIG. 12, outer portion 308 is of generally cylindrical configuration with outwardly extending arcuate lugs 262B formed on a first end of generally cylindrical outer portion 308. The "first end" for purposes of this description is the lower end of quarter turn adapter outlet assembly 25 illustrated in FIGS. 12 and 13.

Lower surfaces 310B of lugs 262B are coplanar with lower surface 306 of generally cylindrical outer portion 308; lower surface 306 is a planar surface. Outwardly facing surfaces 400 of lugs 262 are curved and parallel with the curved cylindrical outer surface of outer portion 308 as illustrated in FIG. 12. Lugs 262B most preferably subtend angles of less than 90°; however lugs 262B may subtend angles from as small as 20° to as great as 150°, depending upon the geometry of the fitting with which lugs 262B matingly engage.

A first axially oriented passageway 402 extends through outer portion 308. First and second annular internal shoulders 404, 406 are formed in first axial passageway 402 and are positioned intermediate the first and second ends of outer portion 308.

Second annular internal shoulder 406 defines an end of a central cylindrical portion 408 of first axial passageway 402 when inner portion 114 is positioned within outer portion 308 as illustrated in FIG. 13 with an upper extremity of inner portion 114 abutting second annular shoulder 406. Second annular internal shoulder 406 is of smaller diameter and smaller annular width than first annular internal shoulder 404. Additionally, second annular internal shoulder 406 is more proximate to first end of outer portion 308 than is first annular internal shoulder 404.

First axial passageway 402 in outer portion 308 houses inner portion 114 as illustrated in FIG. 13 and includes an undercut annular recess 410 located at the first end of cylindrical outer portion 308.

Inner portion 114 has a cylindrical outer surface 413 extending axially lengthwise partway along the length of inner portion 114; cylindrical outer surface 413 of inner portion 114 is in tight fitting facing complemental contact with a corresponding interior cylindrical surface of outer portion 308. An annular protrusion 116 extends from the end of the inner portion annular outer surface 412 to define a first end of inner portion 114. Annular protrusion 116 has a greater diameter at the position of juncture with inner portion lower annular outer surface 412 and a lesser diameter remote from juncture with inner portion lower annular outer surface 412. The juncture defines a perpendicular shoulder 414 relative to inner portion cylindrical outer surface 413. Annular protrusion 116 defines a first end of inner portion 114. Annular protrusion 116 has a greater diameter at juncture with inner portion lower annular outer surface 412 and a lesser diameter remote from juncture with inner portion lower annular outer surface 412. The juncture defines a perpendicular shoulder 414 relative to the inner portion cylindrical outer surface 413.

Axial passageway 278 extends from the first end of inner portion 114 towards the second end. Axial passageway 278 has a lateral opening 304 in the lesser diameter portion of annular protrusion 116 proximate the first end of inner portion 114.

Note that when assembled with a pump, such as pump 14 shown in FIGS. 2 and 3, quarter turn adapter 25 is desirably positioned so that lateral opening 304 in protrusion 116 (neither of which are numbered in FIG. 3) faces to the right in FIG. 3. This facilitates receipt of liquid color pumped by pump 14 as the liquid color flows from a pumping section of pump 14 through channel 86, defined by a recess 84 (shown in FIG. 6) formed in the upper surface of the molded one-piece pump lower body portion 20, to an outlet section of pump 14, which is defined generally by the structure underlying quarter turn adapter outlet assembly 25, and into lateral opening 304 in protrusion 116 for liquid color flow upwardly through quarter turn adapter outlet assembly 25.

During operation, liquid color pumped by a pump, such as the pump illustrated in FIGS. 2 and 3, enters passageway 278 as indicated by the arrow labeled "In" in FIG. 13. If pump pressure is substantial enough, liquid color pushes against ball 56, lifting ball 56 from seat 316 against the downward force exerted by spring 58 on ball 56. As the liquid color raises ball 56, ball 56 loses contact with o-ring 51. This results in liquid color flowing, as pumped by pump 14, upwardly through interior passageway 278 of inner portion 114, through interior passageway 402 of outer portion 308, and out of outlet 46 as indicated by the arrow "Out" in FIG. 13.

Spring 58 may be selected to provide a desired level of resistance to opening of valve 54 such that the pressure of liquid color entering at the "In" arrow, into passageway 278 via lateral opening 304 may be regulated according to design parameters and desires. Similarly, the dimensions of ball 56 and passageways 278, 402 may be varied along with the spring constant of spring 58 to require greater or less pressure of the liquid color as it is pumped, for the liquid color to flow through quarter turn adapter outlet assembly 25.

As shown in FIGS. 15 and 16, respective plates 65, 66, 67 are desirably placed on one another in facing disposition to create the multiple plate quick disconnect sandwich assembly 63. In this configuration, the respective associated larger and smaller passageways in each plate collectively define what may be either an inlet or an outlet passageway 282 and what may be either an inlet or outlet passageway 290. Most desirably the smaller passageways in each plate are sized to accept and to mate with quarter turn adapter outlet assembly 25 or a similar structure. The respective generally circular larger passageways 284, 286 respectively of retainer plate 65 and spacer plate 66 are preferably formed on a radius such that they have essentially the same diameters D1 and their respective smaller generally circular passageways 292, 294 respectively have essentially the same diameters D2. Of course the diameters of the passageways of the retainer plate 65 in the area of their retaining guides differ, as discussed below.

Diameters D1, D2, D3, and D4 are determined by the dimensions of the inlets and outlets being connected.

Diameter D1 is preferably substantially equivalent to the diameter of an associated assembly, for example, from the outer edge of one lug to the outer edge of an opposing lug, for example again, such as lug 262B. Similarly, diameter D2 is preferably substantially equivalent to the cross-sectional width of an associated assembly from the outer edge of one lug to the outer edge of an opposing lug, such as lug 262B.

Diameter D3 and diameter D4 are chosen according to the inlets and outlets being connected using the multiple plate quick disconnect sandwich.

As illustrated in FIGS. 15, 16, and 17, each retaining guide 298, 298A extends angularly from an upwardly sloped leading tab 300 to a trailing edge 312, with leading tab 300 and trailing edge 312 defining the angular extremities of arcuate retaining guides 298, 298A. Each sloped leading tab 300 is angled upwardly, away from spacer plate 66, preferably about ten degrees with respect to the planar surface of retainer plate 65, which is opposite from the surface of retainer plate 65 that facingly contacts spacer plate 66.

As illustrated in FIGS. 14 and 17, spacer plate 66 includes preferably generally rectangular stops 302 extending from the inner periphery of the circular passageways 286, 294 of spacer plate 66. As shown in FIG. 15, when plates 65, 66, 67 are placed on each other to form the quick disconnect sandwich 63, stops 302 are preferably both axially and generally angularly aligned with trailing edges 312 of guides 298, 298A of retainer plate 65.

Each plate 65, 66, 67 of quick disconnect sandwich 63 includes openings 314 that align with the with openings in a structure, such as the liquid color pump illustrated in FIGS. 2 and 3, to allow for mounting quick disconnect sandwich 63 to a structure such as liquid color drum lid 16 as illustrated in FIG. 2, to which rapid connection/disconnection of quarter turn adapter outlet assembly 25 is desired. Nut and bolt combinations are preferably used for this where the nut and bolt combination are designated 88 in FIG. 2, with the nuts designated 90 and the bolts designated 92.

As respecting operation, after quick disconnect sandwich 63 is assembled as shown in FIGS. 15 and 16, and is attached to a structure such as drum lid 16 illustrated in FIGS. 1 and 2, the quarter turn adapter outlet assembly 25 to be quickly connected/disconnected may be centered over the generally circular passageway 290 of quick disconnect plate assembly 63 in a position such that the lower annular protrusion 116 of quarter turn adapter outlet assembly 25 extends through generally circular passageway 296 of base plate 67 and lugs 262B are adjacent the sloped leadings tabs 300 of the retaining guides 298 while a lower planar surface 306 of lugs 262B rests on the upper surface of retainer plate 65.

As quarter turn adapter outlet assembly 25 is rotated, lugs 262B slip under sloped leading tabs 300 and then continue to moveably slide under the remainder of retaining guide 298 along the surface of base plate 67 until lugs 262B abut stops 302 on spacer plate 66. Due to the upwardly angular configuration of sloped leading tabs 300, quarter turn adapter outlet assembly 25 is increasingly pressed against the outwardly facing surface of base plate 67 as quarter turn adapter outlet assembly 25 is rotated into place. The overhang of retaining guides 298 in retainer plate 65 over corresponding space in spacer plate 66, which is occupied by lugs 262B, with guides 298 contacting upper surfaces of lugs 262B as lugs 262B rest on and facingly contact spacer plate 66, prevents displacement of lugs 262B in the vertical direction thereby retaining quarter turn adapter outlet assembly 25 in place.

Most desirably the underside of each retaining guide 298, 298A and/or the corresponding underlying surfaces of retainer plate 66 lying under retaining guides 298, 298A and which lugs 262B facingly contact when quarter turn adapter outlet assembly is matingly engaged with multiple plate quick disconnect sandwich assembly 63, are desirably contoured or machined so that the space between the underside of each retaining guide 298, 298A and the corresponding axially aligned and underlying surfaces of spacer plate 66 diminishes as one proceeds from the leading tabs 300 to trailing edges 312 and rectangular stops 302. This diminishing space, amounting to a taper, assures that quarter turn adapter outlet assembly 25 will be securely and liquid color tightly engaged with multiple plate quick disconnect sandwich assembly 63 when lugs 262B are inserted under retaining guides 298, 298A at tabs 300 and quarter turn adapter assembly 25 is manually rotated in the neighborhood of 90° degrees.

Because stops 302 are preferably located nearly or directly below trailing edges 312 of retaining guides 298, quarter turn adapter outlet assembly 25 requires only a manually applied quarter turn to transition from an unlocked position, in which lugs 262B are located outside leading tabs 300 of retaining guides 298, to a locked position, in which lugs 262B are adjacent stops 302. To disconnect, the quarter turn adapter outlet assembly 25 is manually rotated a quarter turn in the opposite direction such that lugs 262B slide out from under leading tabs 300 of guides 298.

While assembly 25 has been characterized herein as a "quarter turn" outlet assembly, it is to be understood that the sizes of lugs 262B and the corresponding multiple plate quick disconnect sandwich assembly 63 with which quarter turn adapter outlet assembly 25 mates multiple plate quick disconnect sandwich assembly 63 illustrated in FIGS. 14 through 17, can be selected so that less than a quarter turn is required, or that more than a quarter turn is required, to engage and disengage quarter turn adapter outlet assembly 25 from the multiple plate quick disconnect sandwich assembly 63 with which it matingly connects and disconnects. However, a quarter turn is desirable since it facilitates manual connection and disconnection to and from multiple plate quick disconnect assembly 63 facilely and quickly. This allows quick changeover from one quarter turn adaptor outlet assembly 25 to another, thereby facilitating change of the spring constant, and/or a switch to a different or alternate geometry of the through passageway and hence the pressure at which liquid color will be discharged from outlet 46, and allows regulation of the amount of liquid color discharged by quarter turn adapter outlet assembly 25 through pumped liquid color outlet 46. This also facilitates changeover from one color liquid to another.

The following is claimed:

1. A liquid color container with a pneumatic pump, comprising:
   a) the container having a lid with an aperture therein;
   b) a pump body portion within the container and connected to the underside lid, overlying the aperture;
   c) a diaphragm between the pump body portion and the lid, underlying the aperture, being movable away from the lid responsively to pneumatic pressure applied to a side of the diaphragm facing the lid and returning towards the lid upon relief of such pneumatic pressure;
   d) a potentiometer for sensing position of the diaphragm and providing a signal indicative thereof;
   e) a solenoid valve for applying pressurized air to the diaphragm; and
   f) a microprocessor for receiving the signal from the potentiometer and regulating operation of the solenoid valve.

2. The liquid color container of claim 1 further comprising a housing for enclosing the potentiometer, connected to the lid and extending over the aperture, the housing having a passageway for pressurized air flow therethrough from the solenoid valve to the diaphragm.

3. A liquid color pump comprising:
   a) a diaphragm displaceable into a chamber for displacing liquid color therefrom;
   b) a solenoid valve having an inlet port, an exhaust port, and an output port connecting to the inlet port when the valve is energized, and connecting to the exhaust port when the valve is not energized, the valve having said inlet port connected to a compressed air supply, and the valve having said output port pneumatically connecting the diaphragm; and
   c) a microprocessor actuating the solenoid valve responsively to diaphragm position.

4. A method for pumping liquid color, comprising:
   a) providing a valve having an inlet port, an exhaust port and a supply port, the supply port being connected to the inlet port when the valve is energized and being connected to the exhaust port when the valve is not energized;
   b) connecting the inlet port to a supply of pumping fluid;
   c) fluidly connecting the supply port to a pumping diaphragm;
   d) applying pressurized fluid in a series of pulses to the diaphragm by energizing the valve thereby permitting the pressurized fluid to contact the diaphragm.

5. The method of claim 4 further comprising sensing positional displacement of the diaphragm and adjusting the duration of the fluid pulses in response thereto.

6. The method of claim 4 further comprising adjusting interval timing of the pulses.

7. The method of claim 4 further comprising adjusting "on" time of the pulses.

8. The method of claim 4 further comprising adjusting "off" time of the pulses.

* * * * *